United States Patent
Goyal et al.

(10) Patent No.: US 9,602,532 B2
(45) Date of Patent: *Mar. 21, 2017

(54) METHOD AND APPARATUS FOR OPTIMIZING FINITE AUTOMATA PROCESSING

(71) Applicant: Cavium, Inc., San Jose, CA (US)

(72) Inventors: Rajan Goyal, Saratoga, CA (US); Satyanarayana Lakshmipathi Billa, Sunnyvale, CA (US)

(73) Assignee: Cavium, Inc., San Jose, CA (US)

( * ) Notice: Subject to any disclaimer, the term of this patent is extended or adjusted under 35 U.S.C. 154(b) by 566 days.

This patent is subject to a terminal disclaimer.

(21) Appl. No.: 14/169,830

(22) Filed: Jan. 31, 2014

(65) Prior Publication Data

US 2015/0220845 A1   Aug. 6, 2015

(51) Int. Cl.
G06F 17/00 (2006.01)
G06N 5/02 (2006.01)
H04L 29/06 (2006.01)

(52) U.S. Cl.
CPC .............................. H04L 63/1441 (2013.01)

(58) Field of Classification Search
USPC ........................................................ 706/48
See application file for complete search history.

(56) References Cited

U.S. PATENT DOCUMENTS

| | | | |
|---|---|---|---|
| 5,428,554 A | 6/1995 | Laskoski | |
| 5,608,662 A | 3/1997 | Large et al. | |
| 5,893,142 A | 4/1999 | Moyer et al. | |
| 6,314,513 B1 | 11/2001 | Ross et al. | |
| 7,046,848 B1 | 5/2006 | Olcott | |
| 7,225,188 B1 | 5/2007 | Gai et al. | |
| 7,260,558 B1 | 8/2007 | Cheng et al. | |
| 7,460,473 B1 | 12/2008 | Kodama et al. | |
| 7,594,081 B2 | 9/2009 | Bouchard et al. | |

(Continued)

FOREIGN PATENT DOCUMENTS

| | | |
|---|---|---|
| EP | 2276217 A2 | 1/2011 |
| WO | WO 2004/013777 A1 | 2/2004 |

(Continued)

OTHER PUBLICATIONS

Towards Efficient Field Programmable Pattern Matching Array Vlastimil Koar; Jan Korenek 2015 Euromicro Conference on Digital System Design Year: 2015 pp. 1-8, DOI: 10.1109/DSD.2015.97 IEEE Conference Publications.*

(Continued)

*Primary Examiner* — Michael B Holmes
(74) *Attorney, Agent, or Firm* — Hamilton, Brook, Smith & Reynolds, P.C.

(57) ABSTRACT

A method, and corresponding apparatus and system are provided for optimizing matching at least one regular expression pattern in an input stream by walking at least one finite automaton in a speculative manner. The speculative manner may include iteratively walking at least two nodes of a given finite automaton, of the at least one finite automaton, in parallel, with a segment, at a current offset within a payload, of a packet in the input stream, based on positively matching the segment at a given node of the at least two nodes walked in parallel, the current offset being updated to a next offset per iteration.

37 Claims, 21 Drawing Sheets

(56) References Cited

U.S. PATENT DOCUMENTS

| | | | |
|---|---|---|---|
| 7,702,629 B2 | 4/2010 | Cytron et al. | |
| 7,710,988 B1 | 5/2010 | Tripathi et al. | |
| 7,805,392 B1 | 9/2010 | Steele et al. | |
| 7,870,161 B2 | 1/2011 | Wang | |
| 7,944,920 B2 | 5/2011 | Pandya | |
| 7,949,683 B2 | 5/2011 | Goyal | |
| 7,962,434 B2 | 6/2011 | Estan et al. | |
| 8,024,802 B1 | 9/2011 | Preston | |
| 8,051,085 B1 | 11/2011 | Srinivasan et al. | |
| 8,180,803 B2 | 5/2012 | Goyal | |
| 8,301,788 B2 | 10/2012 | Bouchard et al. | |
| 8,392,590 B2 | 3/2013 | Bouchard et al. | |
| 8,407,794 B2 | 3/2013 | Kim et al. | |
| 8,473,523 B2 | 6/2013 | Goyal | |
| 8,554,698 B2 | 10/2013 | Bando et al. | |
| 8,566,344 B2 | 10/2013 | Bando et al. | |
| 8,683,590 B2 | 3/2014 | Namjoshi et al. | |
| 8,862,585 B2* | 10/2014 | Chao | H04L 63/1416 707/737 |
| 9,083,731 B2 | 7/2015 | Namjoshi et al. | |
| 9,203,805 B2* | 12/2015 | Goyal | H04L 63/0254 |
| 9,280,600 B2 | 3/2016 | Hay et al. | |
| 9,398,033 B2* | 7/2016 | Goyal | H04L 63/1416 |
| 9,419,943 B2* | 8/2016 | Goyal | H04L 63/0227 |
| 9,426,165 B2* | 8/2016 | Billa | H04L 63/0245 |
| 9,426,166 B2* | 8/2016 | Billa | H04L 63/0245 |
| 9,432,284 B2* | 8/2016 | Goyal | H04L 45/48 |
| 9,438,561 B2* | 9/2016 | Goyal | H04L 63/0209 |
| 9,495,479 B2* | 11/2016 | Goyal | G06F 17/30985 |
| 9,507,563 B2* | 11/2016 | Billa | H04L 41/28 |
| 9,514,246 B2* | 12/2016 | Billa | H04L 69/22 |
| 2001/0033552 A1 | 10/2001 | Barrack et al. | |
| 2003/0195874 A1 | 10/2003 | Akaboshi | |
| 2004/0059443 A1 | 3/2004 | Sharangpani | |
| 2004/0162826 A1 | 8/2004 | Wyschogrod et al. | |
| 2004/0172234 A1 | 9/2004 | Dapp et al. | |
| 2004/0225999 A1 | 11/2004 | Nuss | |
| 2005/0108518 A1 | 5/2005 | Pandya | |
| 2005/0278781 A1 | 12/2005 | Zhao et al. | |
| 2006/0069872 A1 | 3/2006 | Bouchard et al. | |
| 2006/0075206 A1 | 4/2006 | Bouchard et al. | |
| 2006/0085533 A1 | 4/2006 | Hussain et al. | |
| 2006/0101195 A1 | 5/2006 | Jain | |
| 2006/0136570 A1 | 6/2006 | Pandya | |
| 2006/0235811 A1 | 10/2006 | Fairweather | |
| 2007/0192863 A1 | 8/2007 | Kapoor et al. | |
| 2008/0034427 A1 | 2/2008 | Cadambi et al. | |
| 2008/0047012 A1 | 2/2008 | Rubin et al. | |
| 2008/0059464 A1 | 3/2008 | Law et al. | |
| 2008/0071783 A1 | 3/2008 | Langmead et al. | |
| 2008/0082946 A1 | 4/2008 | Zilic et al. | |
| 2008/0097959 A1 | 4/2008 | Chen et al. | |
| 2008/0101371 A1 | 5/2008 | Law et al. | |
| 2008/0189784 A1 | 8/2008 | Mangione-Smith et al. | |
| 2008/0228991 A1 | 9/2008 | Ferroussat et al. | |
| 2008/0229415 A1 | 9/2008 | Kapoor et al. | |
| 2008/0262991 A1 | 10/2008 | Kapoor et al. | |
| 2008/0270833 A1 | 10/2008 | McMillen | |
| 2008/0271141 A1 | 10/2008 | Goldman et al. | |
| 2009/0106183 A1 | 4/2009 | Estan et al. | |
| 2009/0119279 A1 | 5/2009 | Goyal et al. | |
| 2009/0119399 A1 | 5/2009 | Hussain et al. | |
| 2009/0138440 A1 | 5/2009 | Goyal | |
| 2009/0138494 A1 | 5/2009 | Goyal | |
| 2010/0095162 A1 | 4/2010 | Inakoshi | |
| 2010/0114973 A1 | 5/2010 | Goyal | |
| 2010/0138367 A1 | 6/2010 | Yamagaki | |
| 2010/0146623 A1 | 6/2010 | Namjoshi | |
| 2010/0153420 A1 | 6/2010 | Yang et al. | |
| 2010/0158394 A1 | 6/2010 | Chang et al. | |
| 2010/0174770 A1 | 7/2010 | Pandya | |
| 2010/0192225 A1 | 7/2010 | Ma et al. | |
| 2010/0198850 A1 | 8/2010 | Cytron et al. | |
| 2011/0016154 A1 | 1/2011 | Goyal et al. | |
| 2011/0072199 A1 | 3/2011 | Reiter et al. | |
| 2011/0093484 A1 | 4/2011 | Bando et al. | |
| 2011/0093496 A1 | 4/2011 | Bando et al. | |
| 2011/0113191 A1 | 5/2011 | Pandya | |
| 2011/0119440 A1 | 5/2011 | Pandya | |
| 2011/0173490 A1 | 7/2011 | Narayanaswamy et al. | |
| 2011/0185077 A1 | 7/2011 | Bremler-Barr et al. | |
| 2011/0238855 A1 | 9/2011 | Korsunsky et al. | |
| 2011/0320393 A1 | 12/2011 | Pandya | |
| 2011/0320397 A1 | 12/2011 | Podkolzin et al. | |
| 2012/0017262 A1 | 1/2012 | Kapoor et al. | |
| 2012/0143854 A1 | 6/2012 | Goyal et al. | |
| 2012/0221494 A1 | 8/2012 | Pasetto et al. | |
| 2012/0221497 A1 | 8/2012 | Goyal et al. | |
| 2012/0275642 A1 | 11/2012 | Aller et al. | |
| 2012/0311529 A1 | 12/2012 | Beveridge et al. | |
| 2013/0133064 A1 | 5/2013 | Goyal et al. | |
| 2013/0191916 A1 | 7/2013 | Yao et al. | |
| 2013/0254197 A1 | 9/2013 | Hay et al. | |
| 2013/0290356 A1 | 10/2013 | Yang et al. | |
| 2014/0101176 A1 | 4/2014 | Ruehle | |
| 2014/0173254 A1 | 6/2014 | Ruehle | |
| 2014/0214749 A1 | 7/2014 | Ruehle | |
| 2015/0066927 A1 | 3/2015 | Goyal et al. | |
| 2015/0067123 A1 | 3/2015 | Goyal et al. | |
| 2015/0067200 A1* | 3/2015 | Goyal | H04L 41/28 710/24 |
| 2015/0067776 A1 | 3/2015 | Goyal et al. | |
| 2015/0067836 A1 | 3/2015 | Billa et al. | |
| 2015/0067863 A1 | 3/2015 | Billa et al. | |
| 2015/0186786 A1 | 7/2015 | Goyal et al. | |
| 2015/0220454 A1 | 8/2015 | Goyal et al. | |
| 2015/0262009 A1 | 9/2015 | Szabo | |
| 2015/0293846 A1 | 10/2015 | Goyal et al. | |
| 2015/0295889 A1 | 10/2015 | Goyal et al. | |
| 2015/0295891 A1 | 10/2015 | Goyal et al. | |
| 2016/0021060 A1 | 1/2016 | Goyal et al. | |
| 2016/0021123 A1 | 1/2016 | Goyal et al. | |

FOREIGN PATENT DOCUMENTS

| | | |
|---|---|---|
| WO | WO 2007/109445 A1 | 9/2007 |
| WO | WO 2008/005772 A2 | 1/2008 |
| WO | WO 2013/078053 | 5/2013 |

OTHER PUBLICATIONS

Chain-Based DFA Deflation for Fast and Scalable Regular Expression Matching Using TCAM Kunyang Peng; Siyuan Tang; Min Chen; Qunfeng Dong 2011 ACM/IEEE Seventh Symposium on Architectures for Networking and Communications Systems Year: 2011 pp. 24-35, DOI: 10.1109/ANCS.2011.13 IEEE Conference Publications.*

Optimization of Pattern Matching Circuits for Regular Expression on FPGA Cheng-Hung Lin; Chih-Tsun Huang; Chang-Ping Jiang; Shih-Chieh Chang IEEE Transactions on Very Large Scale Integration (VLSI) Systems Year: 2007, vol. 15, Issue: 12 pp. 1303-1310, DOI: 10.1109/TVLSI.2007.909801 IEEE Journals & Magazines.*

Scalable pattern matching for high speed networks C. R. Clark; D. E. Schimmel 12th Annual IEEE Symposium on Field-Programmable Custom Computing Machines Year: 2004 pp. 249-257, DOI: 10.1109/FCCM.2004.50 IEEE Conference Publications.*

Branch, J.W. et al., "Denial of Service Intrusion Detection Using Time Dependent Deterministic Finite Automata," *Proc. Research Conference*, Troy, NY, Oct. 2002.

Faro, S., et al., "Efficient Variants of the Backward-Oracle-Matching Algorithm," *Proceedings of Prague Stringology Conference*, 2008, pp. 146-160.

Hayes, C.L., et al., "DPICO: A High Speed Deep Packet Inspection Engine Using Compact Finite Automata," ANCS'07 pp. 195-203 (2007).

Navarro, G., "NR-grep: A Fast and Flexible Pattern Matching Tool," pp. 1-49, published 2000.

Navarro, G., "Pattern Matching," pp. 1-24, published 2002.

Becchi, M., "Data Structures, Algorithms and Architectures for Efficient Regular Expression Evaluation," Washington University in St. Louis School of Engineering & Applied Science, published May 2009.

(56) References Cited

OTHER PUBLICATIONS

Becchi, M., et al., "A Hybrid Finite Automation for Practical Deep Packet Inspection," published 2007.

Becchi, M., et al., "Extending Finite Automata to Efficiently Match Perl-compatible Regular Expressions", Proceedings of the 2008 CoNext Conference, Dec. 9-12, 2008.

Chodnicki, S., "An Introduction to Regular Expressions—Adventures with Open Source B1", available at http:--type-exit.org-adventures-with-open-source-bi-2011-05-an-introduction-to-regular-expressions May 7, 2013 (29 pgs).

Hopcroft, J.E. and Ullman, J.D., "Introduction to Automata Theory, Languages, and Computation," *Addison-Wesley Publishing*, Reading, Massachusetts (1979). ISBN 0-201-02988-X.(See chapter 2.).

Rabin, M.O. and Scott, D., "Finite Automata and their Decision Problems," *IBM Journal of Research and Development*, 3(2): 114-125 (1959).

Singh, H., Regular Expressions, http:--www.seeingwithe.org-topic7html.html (2002) downloaded May 7, 2013 (10 pgs).

Sipser, M., "Introduction to the Theory of Computation," *PWS*, Boston (1997). ISBN 0-534-94728-X (See section 1.2: Nondeterminism, pp. 47-63.).

Sun, W., et al., "HFilter: Hybrid Finite Automation Based Stream Filtering for Deep and Recursive XML Data," School of Computer Science and Tech., published 2008.

U.S. Office Action dated Oct. 23, 2015 for U.S. Appl. No. 14/143,586, filed Dec. 30, 2013, entitled "Method and Apparatus for Processing of Finite Automata,".

Notice of Allowance dated May 2, 2016 for U.S. Appl. No. 14/143,586, filed Dec. 30, 2013, entitled "Method and Apparatus for Processing of Finite Automata,".

\* cited by examiner

DFA for the pattern: ".*a[^/n]"
Graph size of 4 nodes

Note: return arrows from each
state if '/n' is seen are not shown.

| PATTERN | NUMBER OF NFA-NODES | NUMBER OF DFA-NODES |
|---|---|---|
| .*a[^\n] | 4 | 4 |
| .*a[^\n][^\n] | 5 | 8 |
| .*a[^\n][^\n][^\n] | 6 | 16 |
| .*a[^\n][^\n][^\n][^\n] | 7 | 32 |
| .*a[^\n][^\n][^\n][^\n][^\n] | 8 | 64 |
| • | • | • |
| • | • | • |
| • | • | • |
| .*a[^\n]$_1$...[^\n]$_n$ | $n+3$ | $2^n$ |

FIG. 2G

LAZY NON-SPECULATIVE PROCESSING ⎯538

| | CURRENT NODE 530 | CURRENT OFFSET/ SEGMENT 532 | MATCH RESULT 534 | ACTION 536 |
|---|---|---|---|---|
| 540a | N0 | 0/h | POSITIVE | UPDATE OFFSET / TRANSITION |
| 540b | N1 | — | — | PUSH {N3,OFFSET1} / TRANSITION |
| 540c | N2 | 1/x | NEGATIVE | POP {N3,OFFSET1} / TRANSITION |
| 540d | N3 | 1/x | POSITIVE | UPDATE OFFSET / TRANSITION |
| 540e | N1 | — | — | PUSH {N3,OFFSET2} / TRANSITION |
| 540f | N2 | 2/a | POSITIVE | UPDATE OFFSET / TRANSITION |
| 540g | N4 | 3/b | POSITIVE | UPDATE OFFSET / TRANSITION |
| 540h | N5 | — | FINAL | DISCONTINUE / POP {N3,OFFSET2} / WRITE RESULT |

FIG. 5B

LAZY SPECULATIVE PROCESSING RULES ⎯570

| | MATCH RESULT OF PARALLEL NODE 572 | MATCH RESULT OF ELEMENT NODE 574 | ACTION 576 |
|---|---|---|---|
| 578a | POSITIVE | POSITIVE | PUSH {PARALLEL NODE, CURRENT OFFSET} UPDATE OFFSET TRANSITION |
| 578b | POSITIVE | NEGATIVE | UPDATE OFFSET |
| 578c | NEGATIVE | POSITIVE | UPDATE OFFSET TRANSITION |
| 578d | NEGATIVE | NEGATIVE | DISCONTINUE |

FIG. 5C

LAZY SPECULATIVE PROCESSING

| CURRENT NODE 530' | CURRENT OFFSET/ SEGMENT 532' | MATCH RESULT 534' | ACTION 536' |
|---|---|---|---|
| N0 | 0/h | POSITIVE | TRANSITION |
| N1 | — | — | TRANSITION |
| N2<br>N3 | 1/x<br>1/x | NEGATIVE<br>POSITIVE | UPDATE OFFSET |
| N2<br>N3 | 2/a<br>2/a | POSITIVE<br>POSITIVE | UPDATE OFFSET<br>PUSH {N3, OFFSET3} |
| N4 | 3/b | POSITIVE | TRANSITION |
| N5 | — | — | DISCONTINUE<br>POP {N3, OFFSET3} |

FIG. 5D

LAZY NON-SPECULATIVE PROCESSING 618

| | CURRENT NODE 620 | CURRENT OFFSET/ SEGMENT 622 | MATCH RESULT 624 | ACTION 626 |
|---|---|---|---|---|
| 628a | N0 | 0/h | POSITIVE | UPDATE OFFSET / TRANSITION |
| 628b | N1N3' | — | — | PUSH {N1N3',OFFSET1} / TRANSITION |
| 628c | N2 | 1/x | NEGATIVE | POP {N1N3',OFFSET1} / TRANSITION |
| 628d | N1N3' | 1/x | POSITIVE | UPDATE OFFSET / TRANSITION |
| 628e | N2 | 2/a | POSITIVE | UPDATE OFFSET / TRANSITION |
| 628f | N4 | 3/b | POSITIVE | UPDATE OFFSET / TRANSITION |
| 628g | N5 | — | — | DISCONTINUE / WRITE RESULT |

(630a, 630b indicated)

FIG. 6B

LAZY SPECULATIVE PROCESSING 648

| | CURRENT NODE 650 | CURRENT OFFSET/ SEGMENT 652 | MATCH RESULT 654 | ACTION 656 |
|---|---|---|---|---|
| 658a | N0 | 0/h | POSITIVE | UPDATE OFFSET / TRANSITION |
| 658b | N1N3' / N2 | 1/x / 1/x | POSITIVE / NEGATIVE | UPDATE OFFSET |
| 658c | N1N3' / N2 | 2/a / 2/a | POSITIVE / POSITIVE | PUSH {N1N3',OFFSET2} / UPDATE OFFSET / TRANSITION |
| 658d | N4 | 3/b | POSITIVE | UPDATE OFFSET / TRANSITION |
| 658e | N5 | — | — | DISCONTINUE / WRITE RESULT / POP {N1N3',OFFSET2} |

FIG. 6C

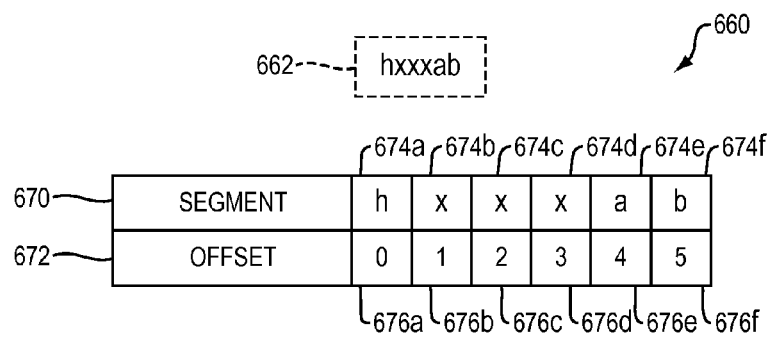

FIG. 6D

LAZY NON-SPECULATIVE PROCESSING 680

| | CURRENT NODE 682 | CURRENT OFFSET/ SEGMENT 684 | MATCH RESULT 686 | ACTION 688 |
|---|---|---|---|---|
| 681a | N0 | 0/h | POSITIVE | UPDATE OFFSET / TRANSITION |
| 681b | N1N3' | — | — | PUSH {N1N3',OFFSET1} / TRANSITION |
| 681c | N2 | 1/x | NEGATIVE | POP {N1N3',OFFSET1} / TRANSITION |
| 681d | N1N3' | 1/x | POSITIVE | UPDATE OFFSET / PUSH {N1N3',OFFSET2} / TRANSITION |
| 681e | N2 | 2/x | NEGATIVE | POP {N1N3',OFFSET2} / TRANSITION |
| 681f | N1N3' | 2/x | POSITIVE | UPDATE OFFSET / PUSH {N1N3',OFFSET3} / TRANSITION |
| 681g | N2 | 3/x | NEGATIVE | POP {N1N3',OFFSET3} / TRANSITION |
| 681h | N1N3' | 3/x | POSITIVE | UPDATE OFFSET / PUSH {N1N3',OFFSET4} / TRANSITION |
| 681i | N2 | 4/a | POSITIVE | UPDATE OFFSET / TRANSITION |
| 681j | N4 | 5/b | POSITIVE | UPDATE OFFSET / TRANSITION |
| 681k | N5 | — | — | POP {N1N3',OFFSET4} / WRITE RESULT / DISCONTINUE |

FIG. 6E

LAZY SPECULATIVE PROCESSING 690

| | CURRENT NODE 692 | CURRENT OFFSET/ SEGMENT 694 | MATCH RESULT 696 | ACTION 698 |
|---|---|---|---|---|
| 691a | N0 | 0/h | POSITIVE | UPDATE OFFSET / TRANSITION |
| 691b | N1N3'<br>N2 | 1/x<br>1/x | POSITIVE<br>NEGATIVE | UPDATE OFFSET |
| 691c | N1N3'<br>N2 | 2/x<br>2/x | POSITIVE<br>NEGATIVE | UPDATE OFFSET |
| 691d | N1N3'<br>N2 | 3/x<br>3/x | POSITIVE<br>NEGATIVE | UPDATE OFFSET |
| 691e | N1N3'<br>N2 | 4/a<br>4/a | POSITIVE<br>POSITIVE | PUSH {N1N3',OFFSET4} / UPDATE OFFSET / TRANSITION |
| 691f | N4 | 5/b | POSITIVE | UPDATE OFFSET / TRANSITION |
| 691g | N5 | — | — | POP {N1N3',OFFSET4} / WRITE RESULT / DISCONTINUE |

FIG. 6F

GREEDY SPECULATIVE PROCESSING RULES ⟶ 970

| MATCH RESULT OF VARIABLE COUNT GREEDY (VCG) NODE 972 | MATCH RESULT OF ELEMENT NODE 974 | ACTION 976 |
|---|---|---|
| POSITIVE | POSITIVE | INCREMENT COUNT<br>UPDATE CURRENT OFFSET<br>STORE CONTEXT<br>ITERATE |
| POSITIVE | NEGATIVE | INCREMENT COUNT<br>UPDATE CURRENT OFFSET<br>ITERATE |
| NEGATIVE | POSITIVE | DISCONTINUE ITERATIVE WALK<br>UPDATE CURRENT OFFSET<br>WALK ELEMENT NODE |
| NEGATIVE | NEGATIVE | DISCONTINUE ITERATIVE WALK<br>TRANSITION BASED ON STORED CONTEXT |

978a — row 1, 978b — row 2, 978c — row 3, 978d — row 4

FIG. 9B

GREEDY SPECULATIVE PROCESSING 1148

| | CURRENT NODE 1150 | CURRENT OFFSET/ SEGMENT 1152 | MATCH RESULT 1154 | ACTION 1156 |
|---|---|---|---|---|
| 1158a | N0 | 0/h | POSITIVE | UPDATE CURRENT OFFSET = 1; FETCH N1N3'; DETECT N1N3' SPECULATIVE; FETCH N2; TRANSITION TO BOTH N1N3' AND N2 AND PROCESS IN PARALLEL |
| 1158b | N1N3' N2 | 1/x 1/x | POSITIVE NEGATIVE | INCREMENT COUNT = 1; UPDATE CURRENT OFFSET = 2 |
| 1158c | N1N3' N2 | 2/x 2/x | POSITIVE NEGATIVE | INCREMENT COUNT = 2; UPDATE CURRENT OFFSET = 3 |
| 1158d | N1N3' N2 | 3/x 3/x | POSITIVE NEGATIVE | INCREMENT COUNT = 3; UPDATE CURRENT OFFSET = 4 |
| 1158e | N1N3' N2 | 4/a 4/a | POSITIVE POSITIVE | INCREMENT COUNT = 4; UPDATE CURRENT OFFSET = 5; PUSH { N2 => N4, RETURN OFFSET = CURRENT OFFSET = 5 } |
| 1158f | N1N3' N2 | 5/b 5/b | POSITIVE NEGATIVE | INCREMENT COUNT = 5; UPDATE CURRENT OFFSET = 6 |
| 1158g | N1N3' N2 | 6/a 6/a | POSITIVE POSITIVE | INCREMENT COUNT = 6; UPDATE CURRENT OFFSET = 7 PUSH { N2 => N4, RETURN OFFSET = CURRENT OFFSET = 7 } |
| 1158h | N1N3' N2 | 7/b 7/b | POSITIVE NEGATIVE | INCREMENT COUNT = 7; UPDATE CURRENT OFFSET = 8 |
| 1158i | N1N3' N2 | 8/\n 8/\n | NEGATIVE NEGATIVE | POP { N2 => N4, RETURN OFFSET = 7 }; SET CURRENT OFFSET = RETURN OFFSET = 7; FETCH N4; TRANSITION |
| 1158j | N4 | 7/b | POSITIVE | UPDATE CURRENT OFFSET = 8; FETCH N5; TRANSITION |
| 1158k | N5 | ---- | FINAL | DISCONTINUE; POP ENTRIES FROM STACK AND DISCARD OR PROCESS BASED ON CORRESPONDING DUP INDICATOR; WRITE RESULT |

FIG. 11

METHOD AND APPARATUS FOR OPTIMIZING FINITE AUTOMATA PROCESSING

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at "wire-speed" (i.e., a rate of data transfer over a physical medium of the network over which data is transmitted and received).

Network processors are available for high-throughput L2 and L3 network protocol processing, that is, performing packet processing to forward packets at wire-speed. Typically, a general purpose processor is used to process L4-L7 network protocols that require more intelligent processing. Although a general purpose processor may perform such compute intensive tasks, it may not provide sufficient performance to process the data so that the data may be forwarded at wire-speed.

An Intrusion Detection System (IDS) application may inspect content of individual packets flowing through a network, and may identify suspicious patterns that may indicate an attempt to break into or compromise a system. One example of a suspicious pattern may be a particular text string in a packet followed by 100 characters later by another particular text string. Such content aware networking may require inspection of the contents of packets at wire speed. The content may be analyzed to determine whether there has been a security breach or an intrusion.

A large number of patterns and rules in the form of regular expressions (also referred to herein as regular expression patterns) may be applied to ensure that all security breaches or intrusions are detected. A regular expression is a compact method for describing a pattern in a string of characters. The simplest pattern matched by a regular expression is a single character or string of characters, for example, /c/ or /cat/. The regular expression may also include operators and meta-characters that have a special meaning Through the use of meta-characters, the regular expression may be used for more complicated searches such as, "abc.*xyz." That is, find the string "abc" followed by the string "xyz," with an unlimited number of characters in-between "abc" and "xyz." Another example is the regular expression "abc . . . abc.*xyz;" that is, find the string "abc," followed two characters later by the string "abc," and an unlimited number of characters later by the string "xyz."

Content searching is typically performed using a search method such as, Deterministic Finite Automata (DFA) or Non-Deterministic Finite Automata (NFA) to process the regular expression.

SUMMARY

Embodiments of the present invention provide a method, apparatus, computer program product, and corresponding system that may search an input stream for at least one regular expression pattern using at least one finite automaton.

According to one embodiment, a method may operatively couple a security appliance to a network. The security appliance may comprise at least one memory and at least one processor. The method may include configuring the at least one memory to store at least one finite automaton including a plurality of nodes generated from at least one regular expression pattern. The method may include operatively coupling the at least one processor to the at least one memory and configuring the at least one processor to walk the at least one finite automaton, with segments of an input stream received via the network, to match the at least one regular expression pattern in the input stream. The walk may include iteratively walking at least two nodes of a given finite automaton, of the at least one finite automaton, in parallel, with a segment, at a current offset within a payload, of a packet in the input stream, based on positively matching the segment at a given node of the at least two nodes walked in parallel. The current offset may be updated to a next offset per iteration.

The segment may also be referred to herein as a payload segment or a segment of the payload. The segment may be a portion of the payload being inspected to determine a match of the segment to an element indicated by a node, of the at least one finite automaton, that is being traversed (i.e., walked) with the segment. The segment may be a value, character, letter, byte or other suitable type of data. The segment may be of any suitable granularity (i.e., length or size). For example, the granularity of the segment may be a byte, multiple bytes, less than a byte, any number of bits, or any other suitable granularity. A type of the element may be a character, character string, character class, or any other suitable type of element.

Iteratively walking may further include, per iteration, walking the at least two nodes, in parallel, with the segment, at the current offset within the payload, within a same processing cycle of the at least one processor.

The at least two nodes may include an element node configured to match a single instance of an element in the payload. Iteratively walking may further include, per iteration, storing a context identifying the next offset and a next node of the given finite automaton based on positively matching the segment, at the current offset in the payload, at the given node and the element node. The element node may be associated with metadata identifying the element and the next node.

The security appliance may further comprise at least one stack and the method may include operatively coupling the at least one processor to the at least one stack. Storing the context may include storing the context in a stack entry and pushing the stack entry onto the at least one stack.

The given node may be a variable count greedy (VCG) node configured to match a threshold number of consecutive instances of an element in the payload and positively matching the segment at the VCG node may be based on positively matching the segment to the element.

Positively matching the segment at the VCG node may include incrementing a count value associated with the VCG node and may further be based on the count value incremented being less than or equal to the threshold number. The method may further include negatively matching the segment at the VCG node based on negatively matching the segment to the element or determining that the threshold number has been exceeded.

The given node of the at least two nodes may be associated with metadata and iteratively walking the at least two nodes, in parallel, may further be based on the metadata of the given node including a speculative processing indicator.

The at least two nodes walked in parallel may include an element node and a VCG node. The given node may be the VCG node. The VCG node may be configured to match a variable number of consecutive instances of a first element in the payload and the element node may be configured to match a single instance of a second element in the payload.

The VCG node may be associated with metadata identifying, either directly or indirectly, the element node, the variable number of consecutive instances, and the first element.

The metadata associated with the VCG node may further include a count value for tracking a total number of consecutive instances of the first element matching in the payload to enable a comparison of the total number to the variable number.

The first element may be one of a first character or first character class and the second element may be one of a second character or second character class.

The given finite automaton may be a non-deterministic finite automaton (NFA) graph and the NFA graph may include a transition from the VCG node to the element node, the VCG node preceding the element node in the NFA graph.

Based on negatively matching the segment, at the current offset in the payload, at the VCG node, and positively matching the segment, at the current offset in the payload, at the element node, the walk may further include discontinuing iteratively walking, updating the current offset to the next offset and walking the element node with a next segment at the next offset in the payload.

Updating the current offset may include incrementing or decrementing the current offset based on a forward or reverse direction of the walk, respectively.

Based on negatively matching the segment at the VCG node and the element node the walk may further include discontinuing iteratively walking Based on a non-empty status of the at least one stack, the method may include popping a stack entry from the stack at least one stack. The stack entry may be a most recently pushed entry onto the stack, and the method may include advancing the walk to a next node with a next segment based on the stack entry popped. Based on an empty status of the at least one stack, the method may include terminating the walk.

The current offset may be updated to the next offset by incrementing or decrementing the current offset.

The current offset may be incremented based on a forward walk direction of walking and decremented based on a reverse walk direction of walking.

The at least one finite automaton may include a deterministic finite automaton (DFA) and at least one NFA. The given finite automaton may be a given NFA of the at least one NFA.

Another example embodiment disclosed herein includes an apparatus corresponding to operations consistent with the apparatus embodiments disclosed herein.

Further, yet another example embodiment may include a non-transitory computer-readable medium having stored thereon a sequence of instructions which, when loaded and executed by a processor, causes a processor to perform methods disclosed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2A-G are example NFA and DFA graphs and a table illustrating the concept of graph explosion.

FIG. 5B is a table of an example embodiment of processing cycles for walking the NFA graph of FIG. 5A with a payload in a lazy non-speculative manner.

FIG. 5C is a block diagram of an example embodiment of a table of lazy speculative processing rules.

FIG. 5D is a table of an example embodiment of processing cycles for traversing the NFA graph of FIG. 5A with the payload in a lazy speculative manner.

FIG. 6B is a table of an example embodiment of processing cycles for traversing the NFA graph of FIG. 6A in a lazy non-speculative manner with the payload.

FIG. 6C is a table of another example embodiment of processing cycles for traversing the NFA graph of FIG. 6A with the payload.

FIG. 6D is a block diagram of another payload that may be traversed with the NFA graph of FIG. 6A.

FIG. 6E is a table of an example embodiment of processing cycles for traversing the NFA graph of FIG. 6A with the payload of FIG. 6D in a non-speculative manner.

FIG. 6F is a table of another example embodiment of processing cycles for traversing the NFA graph of FIG. 6A with the payload of FIG. 6D in a speculative manner.

FIG. 9B is a block diagram of an example embodiment of a table of greedy speculative processing rules.

FIG. 11 is a table of an example embodiment of processing cycles for traversing the NFA graph of FIG. 7 in a greedy speculative manner with the payload.

DETAILED DESCRIPTION

Before describing example embodiments of the present invention in detail, an example security application in which the embodiments may be implemented and typical processing using deterministic finite automata (DFA) and non-deterministic finite automata (NFA) are described immediately below to help the reader understand inventive features disclosed herein.

Figure 1:
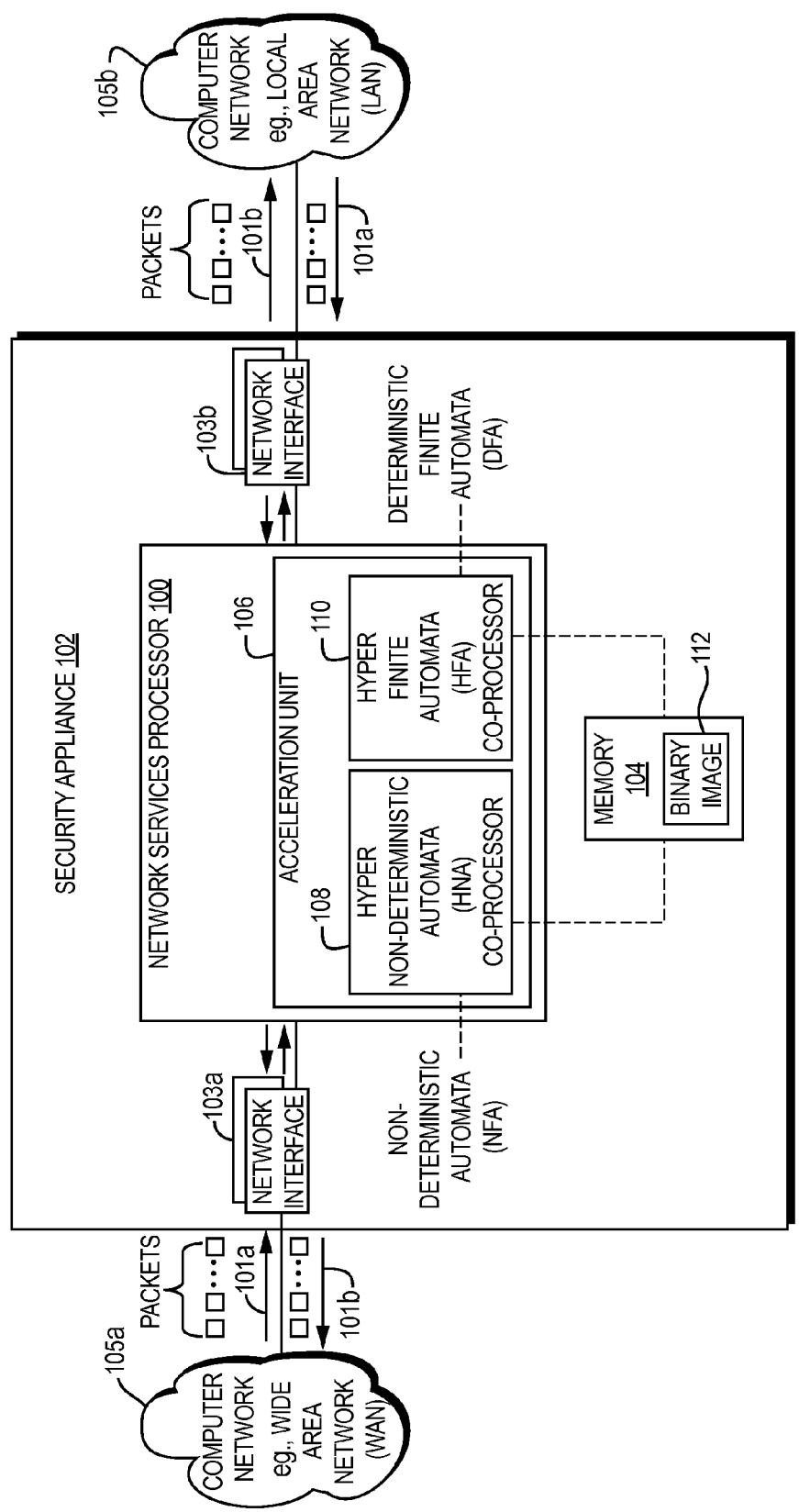
FIG. 1 is a block diagram of an embodiment of a security appliance in which embodiments disclosed herein may be implemented.

FIG. 1 is a block diagram of an embodiment of a security appliance 102 in which embodiments disclosed herein may be implemented. The security appliance 102 may include a network services processor 100. The security appliance 102 may be a standalone system that may switch packets received at one network interface 103a to another network interface 103b and may perform a plurality of security functions on received packets prior to forwarding the packets. For example, the security appliance 102 may be used to perform security processing on packets 101a that may be received on a Wide Area Network (WAN) 105a, or any other suitable network, prior to forwarding the processed packets 101b to a Local Area Network (LAN) 105b, or any other suitable network.

The network services processor 100 may be configured to process Open System Interconnection (OSI) network L2-L7 layer protocols encapsulated in received packets. As is well-known to those skilled in the art, the OSI reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communications between users, for example, file transfer and electronic mail.

The network services processor 100 may schedule and queue work (e.g., packet processing operations) for upper level network protocols, for example L4-L7, and enable processing of upper level network protocols in received packets to be performed to forward packets at wire-speed. By processing the protocols to forward the packets at wire-speed, the network services processor 100 does not slow down the network data transfer rate. The network services processor 100 may receive packets from the network interfaces 103a or 103b that may be physical hardware interfaces, and may perform L2-L7 network protocol processing on the received packets. The network services processor 100 may subsequently forward processed packets 101b through the network interfaces 103a or 103b to another hop in the network, a final destination, or through another bus (not shown) for further processing by a host processor (not shown). The network protocol processing may include processing of network security protocols such as Firewall, Application Firewall, Virtual Private Network (VPN) including IP Security (IPSec) and/or Secure Sockets Layer (SSL), Intrusion Detection System (IDS) and Anti-virus (AV).

The network services processor 100 may deliver high application performance using a plurality of processors (i.e., cores). Each of the cores (not shown) may be dedicated to performing data plane or control plane operations. A data plane operation may include packet operations for forwarding packets. A control plane operation may include processing of portions of complex higher level protocols such as Internet Protocol Security (IPSec), Transmission Control Protocol (TCP) and Secure Sockets Layer (SSL). The data plane operation may include processing of other portions of these complex higher level protocols.

The network services processor 100 may also include application specific co-processors that may offload the cores so that the network services processor 100 achieves high-throughput. For example, the network services processor 100 may include an acceleration unit 106 that may include a hyper non-deterministic automata (HNA) co-processor 108 for hardware acceleration of NFA processing and a hyper finite automata (HFA) co-processor 110 for hardware acceleration of DFA processing. The HNA 108 and HFA 110 co-processors may be configured to offload the network services processor 100 general purpose cores (not shown) from the heavy burden of performing compute and memory intensive pattern matching methods.

The network services processor 100 may perform pattern searching, regular expression processing, content validation, transformation, and security accelerate packet processing. The regular expression processing and the pattern searching may be used to perform string matching for AV and IDS applications and other applications that may require string matching. A memory controller (not shown) in the network services processor 100 may control access to a memory 104 that is operatively coupled to the network services processor 100. The memory may be internal (i.e., on-chip) or external (i.e., off chip), or a combination thereof, and may be configured to store data packets received, such as packets 101a for processing by the network services processor 100. The memory may be configured to store compiled rules data utilized for lookup and pattern matching in DFA and NFA graph expression searches. The compiled rules data may be stored as a binary image 112 that may include compiled rules data for both DFA and NFA, or multiple binary images separating DFA compiled rules data from NFA compiled rules data.

Typical content aware application processing may use either a DFA or an NFA to recognize patterns in content of received packets. DFA and NFA are both finite state machines, that is, models of computation each including a set of states, a start-state, an input alphabet (set of all possible symbols) and a transition function. Computation begins in the start-state and changes to new states dependent on the transition function.

The pattern is commonly expressed using a regular expression that includes atomic elements, for example, normal text characters such as, A-Z and 0-9, and meta-characters, such as, *, ^ and |. The atomic elements of a regular expression are the symbols (single characters) to be matched. Atomic elements may be combined with meta-characters that allow concatenation (+) alternation (|), and Kleene-star (*). The meta-character for concatenation may be used to create multiple character matching patterns from a single character (or sub-strings) while the meta-character for alternation (|) may be used to create a regular expression that can match any of two or more sub-strings. The meta-character Kleene-star (*) allows a pattern to match any number of times, including no occurrences of the preceding character or string of characters.

Combining different operators and single characters allows complex subpatterns of expressions to be constructed. For example, a subpattern such as (th(is|at)*) may match multiple character strings, such as: th, this, that, thisis, thisat, thatis, or thatat. Another example of a complex subpattern of an expression may be one that incorporates a character class construct [ . . . ] that allows listing of a list of characters for which to search. For example, gr[ea]y looks for both grey and gray. Other complex subpattern examples are those that may use a dash to indicate a range of characters, for example, [A-Z], or a meta-character "." that matches any one character. An element of the pattern may be an atomic element or a combination of one or more atomic elements in combination with one or more meta-characters.

The input to the DFA or NFA state machine is typically a segment, such as a string of (8-bit) bytes, that is, the alphabet may be a single byte (one character or symbol), from an input stream (i.e., received packets). Each segment (e.g., byte) in the input stream may result in a transition from one state to another state. The states and the transition functions of the DFA or NFA state machine may be represented by a graph. Each node in the graph may represent a state and arcs (also referred to herein as transition arcs) in the graph may represent state transitions. A current state of the state machine may be represented by a node identifier that selects a particular node in the graph.

Using DFA to process a regular expression and to find a pattern or patterns described by a regular expression in an input stream of characters may be characterized as having deterministic run time performance. A next state of a DFA may be determined from an input character (or symbol), and a current state of the DFA, because there is only one state transition per DFA state. As such, run time performance of the DFA is said to be deterministic and the behavior can be completely predicted from the input. However, a tradeoff for determinism is a graph in which the number of nodes (or graph size) may grow exponentially with the size of a pattern.

In contrast, the number of nodes (or graph size) of an NFA graph may be characterized as growing linearly with the size of the pattern. However, using NFA to process the regular expression, and to find a pattern or patterns described by the regular expression in the input stream of characters, may be characterized as having non-deterministic run time performance. For example, given an input character (or symbol) and a current state of the NFA, it is possible that there is more than one next state of the NFA to which to transition. As such, a next state of the NFA cannot be uniquely determined from the input and the current state of the NFA. Thus, run time performance of the NFA is said to be non-deterministic as the behavior cannot be completely predicted from the input.

Figure 2A:
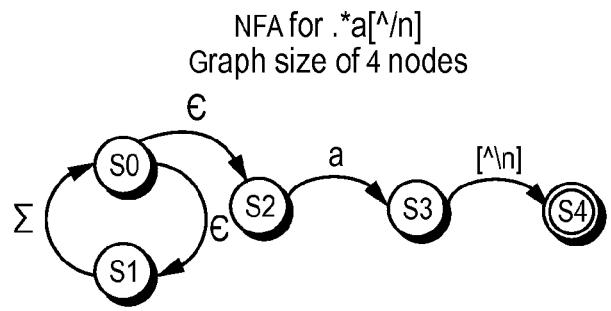
Figure 2B:
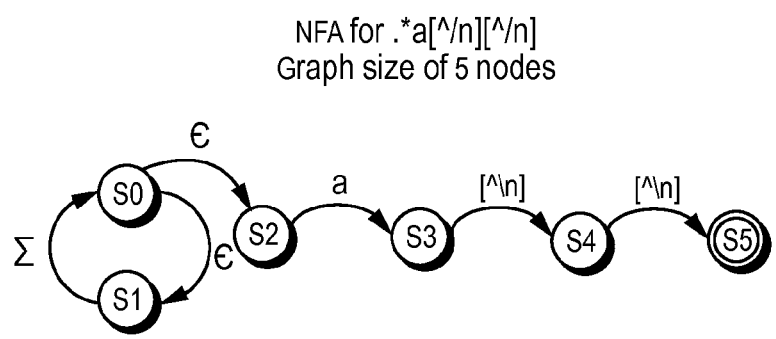
Figure 2C:
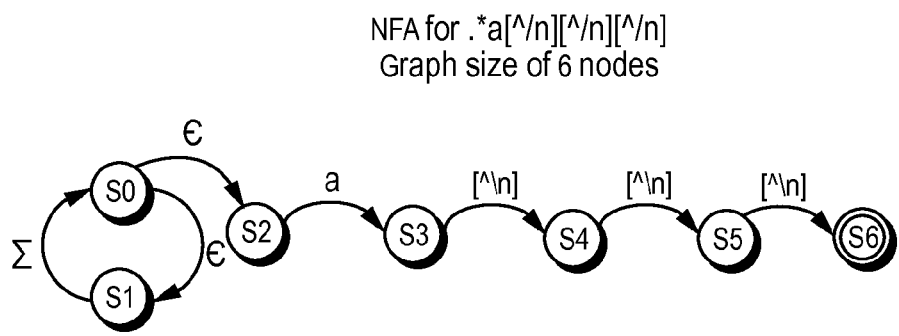
Figure 2D:
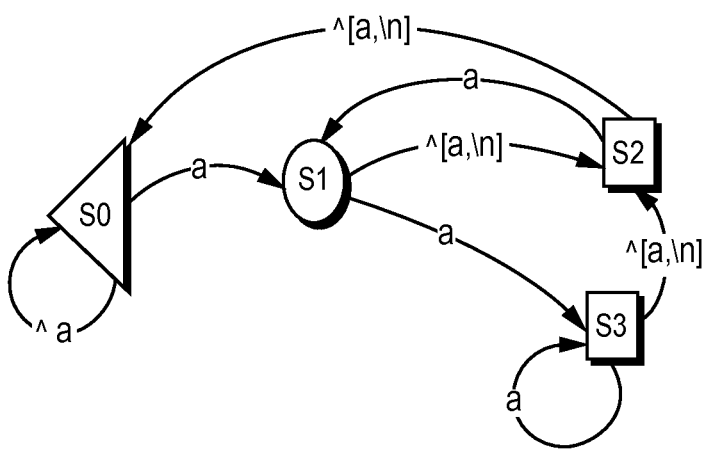
Figure 2E:
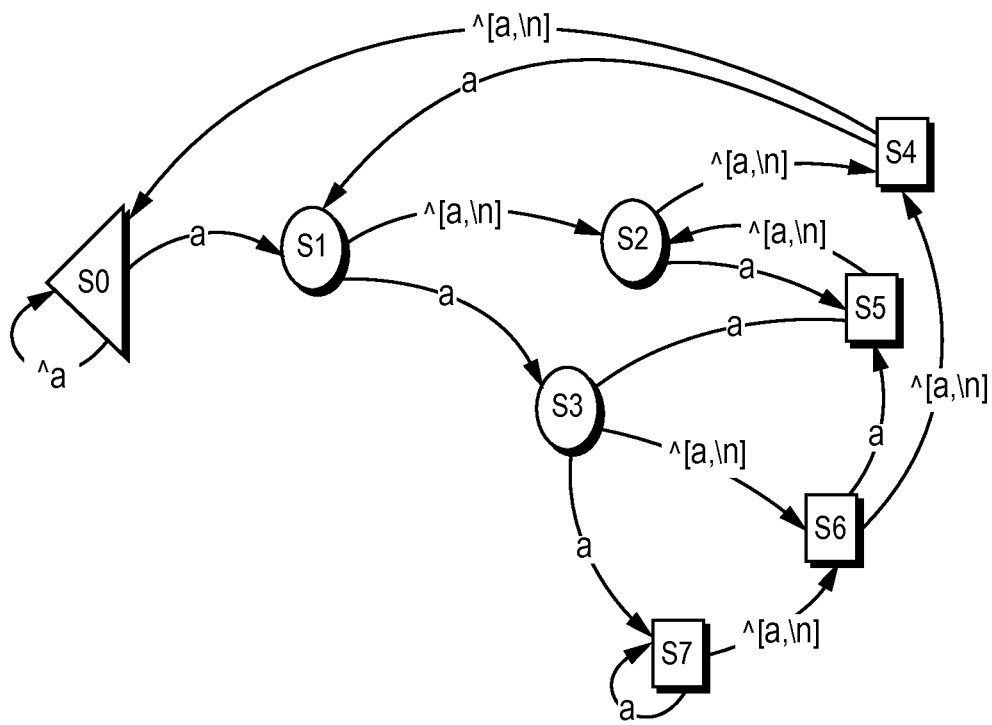
Figure 2F:
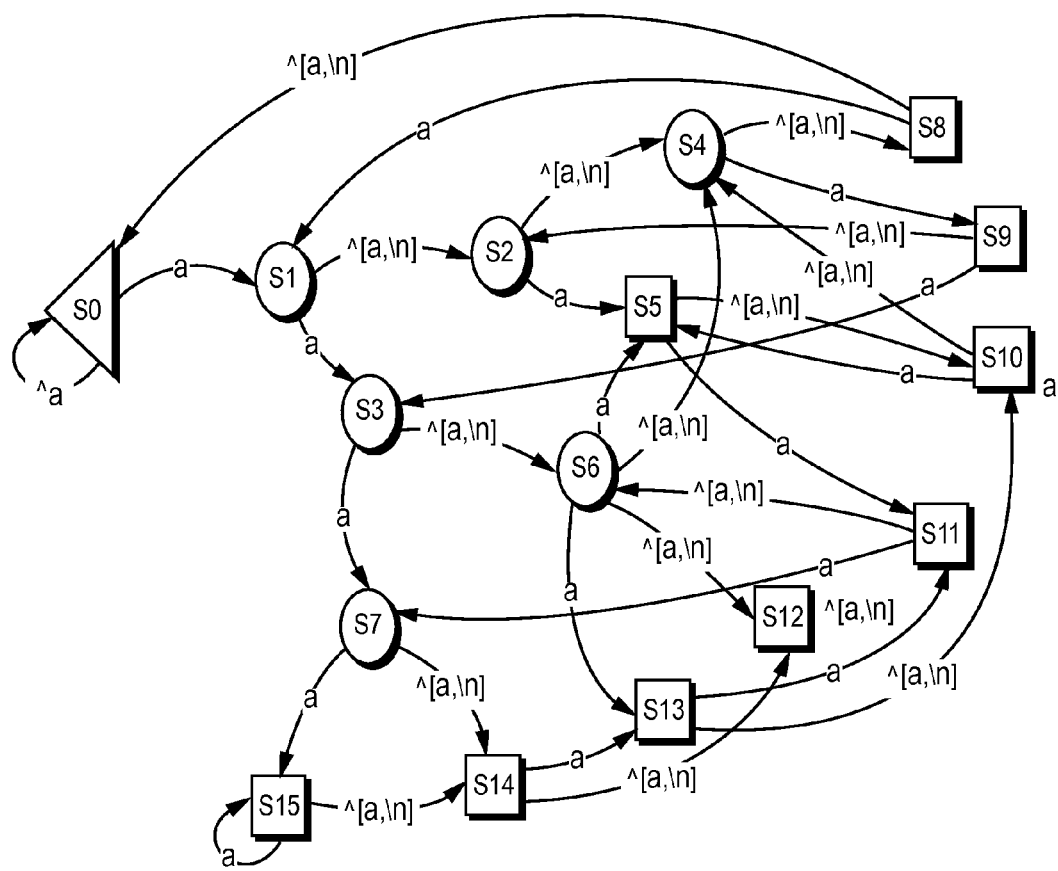

FIGS. 2A-G show the concept of DFA "graph explosion." FIGS. 2A, 2B, and 2C show NFA graphs for patterns ".*a[^\n]," ".*a[^\n] [^\n]," ".*a[^\n] [^\n] [^\n]," respectively, and FIGS. 2D, 2E, and 2F show DFA graphs for the same patterns, respectively. As shown in FIGS. 2A-2F, and summarized by the table of FIG. 2G, an NFA graph may grow linearly for some patterns while a DFA graph for the same patterns may grow exponentially resulting in a graph explosion. As shown, for a given pattern or patterns, a number of DFA states may be larger than a number of NFA states, typically on the order of several hundred more or a thousand more states. This is an example of "graph explosion," which is a hallmark characteristic of DFA.

According to embodiments disclosed herein, content searching may be performed using DFA, NFA, or a combination thereof. According to one embodiment, a run time processor, co-processor, or a combination thereof, may be implemented in hardware and may be configured to implement a compiler and a walker.

The compiler may compile a pattern or an input list of patterns (also known as signatures or rules) into the DFA, NFA, or combination thereof. The DFA and NFA may be binary data structures, such as DFA and NFA graphs and tables.

The walker may perform run time processing, for example, actions that may identify an existence of a pattern in an input stream, or matching the pattern to content in the input stream. Content may be a payload portion of an Internet Protocol (IP) datagram, or any other suitable payload in an input stream. Run time processing of DFA or NFA graphs may be referred to herein as walking or traversing the DFA or NFA graphs, with the payload, to determine a pattern match. A processor configured to generate DFA, NFA, or a combination thereof, may be referred to herein as a compiler. A processor configured to implement run time processing of a payload using the generated DFA, NFA, or combination thereof, may be referred to as a walker herein. According to embodiments disclosed herein, the network services processor 100 may be configured to implement a compiler and a walker in the security appliance 102.

Figure 3:
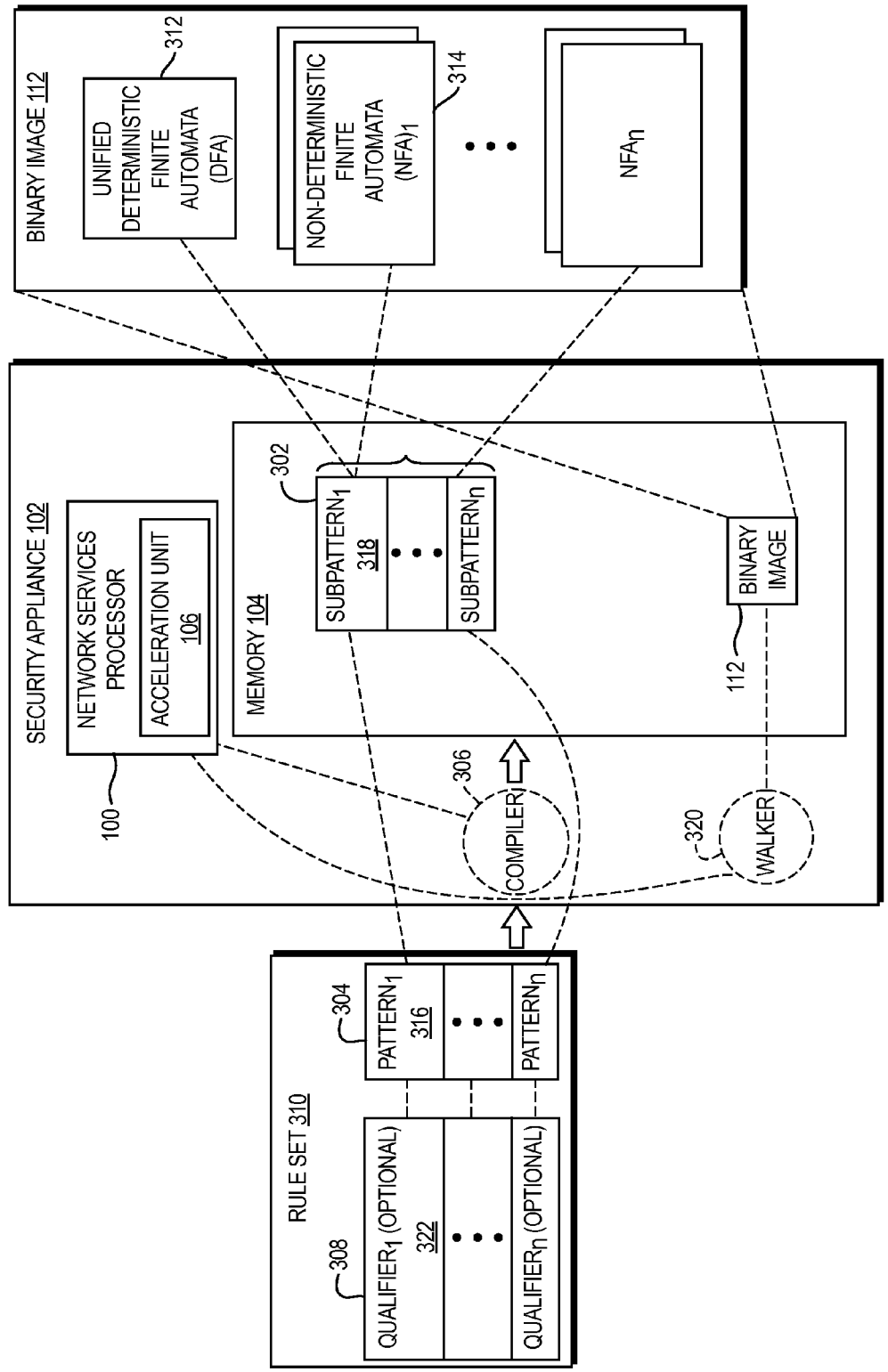
FIG. 3 is another block diagram of an embodiment of a security appliance in which embodiments disclosed herein may be implemented.

FIG. 3A is a block diagram of another embodiment of the security appliance 102 of FIG. 1 in which embodiments disclosed herein may be implemented. As described in reference to FIG. 1, the security appliance 102 may be operatively coupled to one or more networks and may comprise the memory 104 and the network services processor 100 that may include the acceleration unit 106. In reference to FIG. 3A, the network services processor 100 may be configured to implement a compiler 306 that generates the binary image 112 and a walker 320 that uses the binary image 112. For example, the compiler 306 may generate the binary image 112 that includes compiled rules data used by the walker 320 for performing pattern matching methods on received packets 101a (shown in FIG. 1). The compiler 306 may generate the binary image 112 by determining compiled rules data for DFA, NFA, or a combination thereof, based on determining rules data advantageously suited for DFA and NFA.

According to embodiments disclosed herein, the compiler 306 may generate the binary image 112 by processing a rule set 310 that may include a set of one or more regular expression patterns 304 and optional qualifiers 308. From the rule set 310, the compiler 306 may generate a unified DFA 312 using subpatterns selected from all of the one or more regular expression patterns and at least one NFA 314 for at least one pattern in the set of one or more regular expression patterns 304 for use by the walker 320 during run time processing, and metadata (not shown) including mapping information for transitioning the walker 320 between states (not shown) of the unified DFA 312 and states of the at least one NFA 314. According to embodiments disclosed herein, each NFA that is generated may be for a particular pattern in the set, whereas a unified DFA may be generated based on all subpatterns from all patterns in the set.

The unified DFA 312 and the at least one NFA 314 may be represented data structure-wise as graphs, or in any other suitable form, and the mapping in the metadata may be represented data structure-wise as one or more tables, or in any other suitable form. According to embodiments disclosed herein, if a subpattern selected from a given pattern is the entire given pattern, then no NFA is generated for the given pattern.

The walker 320 may be configured to walk the unified DFA 312 and the at least one NFA 314 with a payload by transitioning states of the unified DFA 312 and the at least one NFA based on processing (also referred to herein as consuming) segments from the payload in the received packets 101a. Processing may including updating a current offset within the payload from a current segment to another segment. Updating the current offset may be based on a direction of walking, for example, the walker 320 may walk the unified DFA 312 or the at least one NFA 314 in a forward or reverse direction, incrementing the current offset based on the forward direction of the walk and decrementing the current offset based on the reverse direction of the walk. As such, the walker 320 walks the payload through the unified DFA 312 and the at least one NFA 314.

The rule set 310 may include a set of one or more regular expression patterns 304 and may be in a form of a Perl Compatible Regular Expression (PCRE) script file or any other suitable form currently known or hereinafter developed. PCRE has become a de facto standard for regular expression syntax in security and networking applications. As more applications requiring deep packet inspections have emerged or more threats have become prevalent in the Internet, corresponding signatures/patterns to identify virus/attacks or applications have also become more complex. For example, signature databases have evolved from having simple string patterns to regular expression (regex) patterns with wild card characters, ranges, character classes, and advanced PCRE signatures.

As shown in FIG. 3A, the optional qualifiers 308 may each be associated with a pattern in the set of regular expression patterns 304. For example, optional qualifiers 322 may be associated with pattern 316. The optional qualifiers 308 may each be one or more qualifiers designating desired custom, advanced PCRE signature options, or other suitable options for processing the pattern associated with the qualifiers. The compiler 306 may generate a unified DFA 312 using subpatterns 302 selected from all patterns in the set of one or more regular expression patterns 304. The compiler 306 may select subpatterns 302 from each pattern in the set of one or more regular expression patterns 304. The compiler 306 may also generate at least one NFA 314 for at least one pattern 316 in the set, a portion (not shown) of the at least one pattern 316 used for generating the at least one NFA 314, and at least one walk direction for run time processing (i.e. walking) of the at least one NFA 314, may be determined based on whether a length of the subpattern selected 318 is fixed or variable and a location of the subpattern selected 318 within the at least one pattern 316. The compiler 306 may store the unified DFA 312 and the at least one NFA 314 in the at least one memory 104.

A subpattern is a set of one or more consecutive elements from a pattern, wherein each element from the pattern may be represented by a node in a DFA or NFA graph, for purposes of matching segments from the payload. An element, as described above, may be a single text character represented by a node or a character class represented by a node. The compiler 306 may determine which subpatterns in the pattern are better suited for NFA based on whether or not a subpattern is likely to cause excessive DFA graph explosion, as described above in reference to FIGS. 2A-G. For example, generating a DFA from a subpattern including consecutive text characters would not result in DFA graph explosion, whereas complex subpatterns, as described above, may include operators as well as characters and, thus, may cause DFA graph explosion. For example, a subpattern including a wild card character or a larger character class repeated multiple times (e.g., [^\n]* or [^\n] {16}) may cause excessive states in a DFA and, thus, may be more advantageously suited for NFA.

Determining the match of the entire pattern may be found by utilizing match results from the unified DFA, the at least one NFA, or a combination thereof. According to embodiments disclosed herein, if a payload in the received packets 101 includes content that matches a subpattern selected 318 from a pattern 316, the walker may transition to walk at least one NFA for the pattern 316. The walker 320 may report a match of the subpattern selected 318 and an offset that identifies a location in the received packets of the last character of the matching subpattern as an end offset for the subpattern in the payload.

A subpattern match may be a partial match for the pattern if the subpattern is a subset of the pattern. As such, the walker 320 may continue the search for the remainder of the pattern in the payload by walking at least one NFA for the pattern, in order to determine a final match for the pattern. It should be understood that the pattern may traverse one or more payloads in the received packets 101a.

Figure 4:
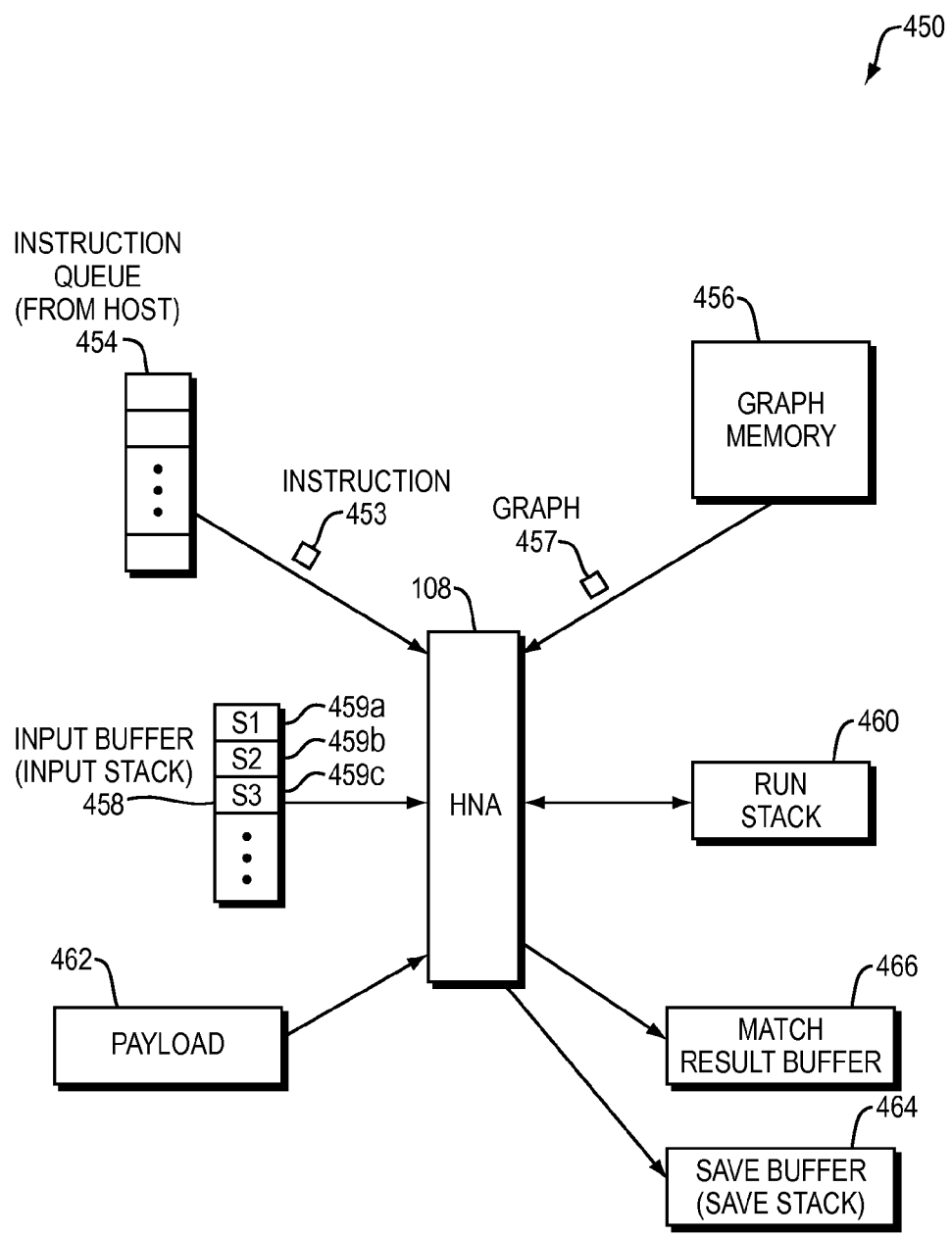
FIG. 4 is a block diagram of an example embodiment of an environment of a hyper non-deterministic automata (HNA) co-processor.

FIG. 4 is a block diagram 450 of an example embodiment of an environment of the HNA co-processor 108 of FIG. 1. According to embodiments disclosed herein, the HFA 110 may be configured to implement functionality of the walker 320 with reference to DFA processing and the HNA 108 may be configured to implement functionality of the walker 320 with reference to NFA processing.

According to embodiments disclosed herein, the HNA 108 may be configured to read at least one instruction 453 from an instruction queue 454. The instruction queue 454 may be configured to store the at least one instruction 453 that may be sent by a host (not shown) to be processed by the HNA 108. The at least one instruction 453 may include at least one job, such as S1 459a, S2 459b, or S3 459c. Each at least one job may be determined based on partial match results identified by the HFA co-processor 110 of FIG. 1 for a given subpattern of the subpatterns 302 of FIG. 3A that is matching in the input stream.

A given job of the at least one job may indicate a given NFA of the at least one NFA 314, at least one given node of the given NFA, at least one given offset in a given payload, as well as at least one walk direction, each at least one walk direction corresponding to one node of the at least one given node. Each at least one job may include results of processing by the HFA, enabling the HNA to advance a match in the given NFA for a given pattern of the at least one pattern 304 that corresponds to the given subpattern. As such, each job represents partial match results determined by the HFA co-processor 110 in order to advancing the match of the given pattern by the HNA co-processor 108.

The HNA 108 may process the at least one instruction 453 by reading at least one pointer (not shown), or other suitable instruction information, stored therein. The at least one pointer may include an input buffer pointer (not shown) to an input buffer 458. The at least one instruction 453 may also include a payload pointer (not shown) to a payload 462, a result buffer pointer (not shown) to a match result buffer 466, a save buffer pointer (not shown) to a save buffer 464, and a run stack pointer (not shown) to a run stack 460.

The input buffer 458, run stack 460, and the save buffer 464 may be referred to herein as an input stack, run stack, and save stack, respectively, although the input buffer 458, run stack 460, and save buffer 464 may or may not exhibit the Last In First Out (LIFO) properties of a stack. The input buffer 458, run stack 460, and save buffer 464 may be located within a same or different physical buffer. If located within the same physical buffer, entries of the input stack 458, run stack 460, and save stack 464 may be differentiated based on a field setting of the entries, or differentiated in any other suitable manner. The input stack 458 and the run stack 460 may be located in the same physical buffer that may be on-chip and the save buffer 464 may be located in another physical buffer that may be off-chip.

The at least one job, such as S1 459a, S2 459b, or S3 459c, of the at least one instruction 453, may be stored in the input stack 458 for processing by the HNA 108. The at least one job of the at least one instruction may each belong to a same given payload, such as the payload 462, that was processed by the HFA 110.

The HNA 108 may be configured to load (i.e., fetch or retrieve) at least one job from the input buffer 458, such as jobs S1 459a, S2 459b, or S3 459c, based on the input buffer pointer. The HNA 108 may push (i.e., store) the at least one job to the run stack 460. The HNA 108 may pop (i.e., read, fetch, load, etc.) a given job from the run stack, such as entry S1 459a, S2 459b, or S3 459c, and process the given job. Each at least one job (e.g., S1 459a, S2 459b, or S3 459c) may include a payload offset (not shown) to a segment (not shown) of the payload 462, and a pointer to a graph 457, that may be a given finite automata of at least one finite automata, such as the at least one NFA 314 of FIG. 3.

The HNA 108 may load (i.e., fetch) the graph 457 from the graph memory 456 that may be included in the binary image 112 of FIG. 1 and FIG. 3A, and begin processing the graph 457 using payload segments corresponding with respective payload offsets of the payload 462. The HNA 108 may process the graph 457, by walking nodes of the graph 457 with payload segments. A partially matching path of the graph 457 may include at least two nodes of the graph 457 that match consecutive segments of the payload to a given pattern used to generate the graph 457. The partially matching path may be referred to herein as a thread or an active thread.

As the HNA 108 may process the graph 457 using payload segments from the payload 462, pushing and popping entries to/from the run stack 460 to save and resume its place in the graph 457. For example, the HNA 108 may need to save its place in the graph if a walked node presents multiple options for a next node to walk. For example, the HNA 108 may walk a node that presents multiple processing path options, such as a fork represented in the graph. According to embodiments disclosed herein, nodes of a DFA or NFA may be associated with a node type. Nodes associated with a split or variable count node type may present multiple processing path options. The split and variable count node types are further disclosed below in reference to FIG. 5A and FIG. 6A.

According to embodiments disclosed herein, the HNA 108 may be configured to select a given path, of the multiple processing paths, and push an entry to the run stack 460 that may enable the HNA 108 to return and proceed along the unselected path, of the multiple processing paths, based on determining a mismatch (i.e., negative) result at walked node along the selected path. As such, pushing the entry on the run stack 460 may save a place in the graph 457 that represents unexplored context. The unexplored context may indicate a given node of the graph 457 and a corresponding payload offset to enable the HNA 108 to return to the given node and walk the given node with the given segment of the payload 462, as the given segment may be located at the corresponding payload offset in the payload 462. As such, the run stack 460 may be used to enable the engine 462 to remember and later walk an unexplored path of the graph 457. Pushing or storing an entry that indicates a given node and a corresponding offset in a given payload may be referred to herein as storing unexplored context, thread or inactive thread. Popping, fetching, or loading an entry that indicates the given node and the corresponding offset in the given payload in order to walk the given node with a segment located at the corresponding offset in the given payload may be referred to herein as activating a thread. Discarding an entry that indicates the given node and the corresponding offset in the given payload may be referred to herein as flushing an entry or retiring a thread.

The run stack 460 may enable the HNA 108 to save its place in the graph 457 in an event that an end of the payload 462 is reached while walking segments of the payload 462 with the graph 457. For example, the HNA 108 may determine that the payload or a portion of the payload 462 is partially matching a given pattern and that a current payload offset of the payload 462 is an end offset of the payload 462. As such, the HNA 108 may determine that only a partial match of the given pattern was found and that the entire payload 462 was processed. As such, the HNA 108 may save the run stack 460 content to the save buffer 464 to continue a walk with a next payload corresponding to a same flow as the payload 462 that was processed. The save buffer 464 may be configured to store at least one run stack entry of the run stack 460, mirroring a running state of the run stack 460 in an event the entire payload 462 is processed.

Based on finding a final (i.e., entire or complete) match of the pattern, the HNA may pop and discard entries in the run stack 460 that are associated with the current job, for example the job loaded from the input buffer, such as S1 459a, and save match results (not shown) to the match results buffer 466. Alternatively, the HNA 108 may continue processing entries of the run stack 460 that are associated with the current job as all possible matching paths may be of interest.

The match results may include a node address associated with a node at which the final match of the pattern was determined. The node at which the final match of the pattern was determined may be referred to herein as a marked node. The node address, or other identifier of a final match location in the graph 457, identifier of the matching pattern, length of the matching pattern, or any other suitable match results or a combination thereof, may be included in the match results.

Based on processing all of the run stack entries associated with the current job, the HNA 108 may load a next job from the run stack that has been previously loaded from the input buffer 458 (e.g., S2 459b), as the HNA 108 may be configured to process jobs of the instruction 453 sequentially. As such, the HNA 108 may fetch a next graph (not shown) from the graph memory 456 walk the next graph with one or more payload segments from the payload 462 identified by the next job, and continue to process additional jobs until the run stack 460 is empty.

Based on finding a mismatch of the payload 462 while walking the graph 457 with the payload 462, the HNA 108 may pop an entry from the run stack 460 that is associated with the current job (e.g., S1 459a) and walk a next node with a next segment of the payload 462 based on content of the entry popped. If the run stack 460 does not include an entry associated with the current job, the HNA 108 may be done with the current job and may load a next job from the run stack 460 that has been previously loaded from the input buffer 458 (e.g., S2 459c). As such, the HNA 108 may be configured to walk a next graph based on the next job loaded, and continue to process additional jobs until the run stack 460 is empty.

According to embodiments disclosed herein, the walker 320 functionality of the HNA 108 may include optimizing matching at least one regular expression pattern to an input stream by walking a given NFA in a speculative manner. The speculative manner may include walking at least two nodes of the given NFA, in parallel, with a segment, at a given offset within a payload of a packet in the input stream. The walking may include determining a match result for the segment, at the given offset within the payload, at each node of the at least two nodes. The walking may further include determining at least one subsequent action for walking the given finite automaton, based on an aggregation of each match result determined. Such optimized matching of the at least one regular expression pattern to the input stream by walking the given NFA in the speculative manner is further disclosed below.

Figure 5A:
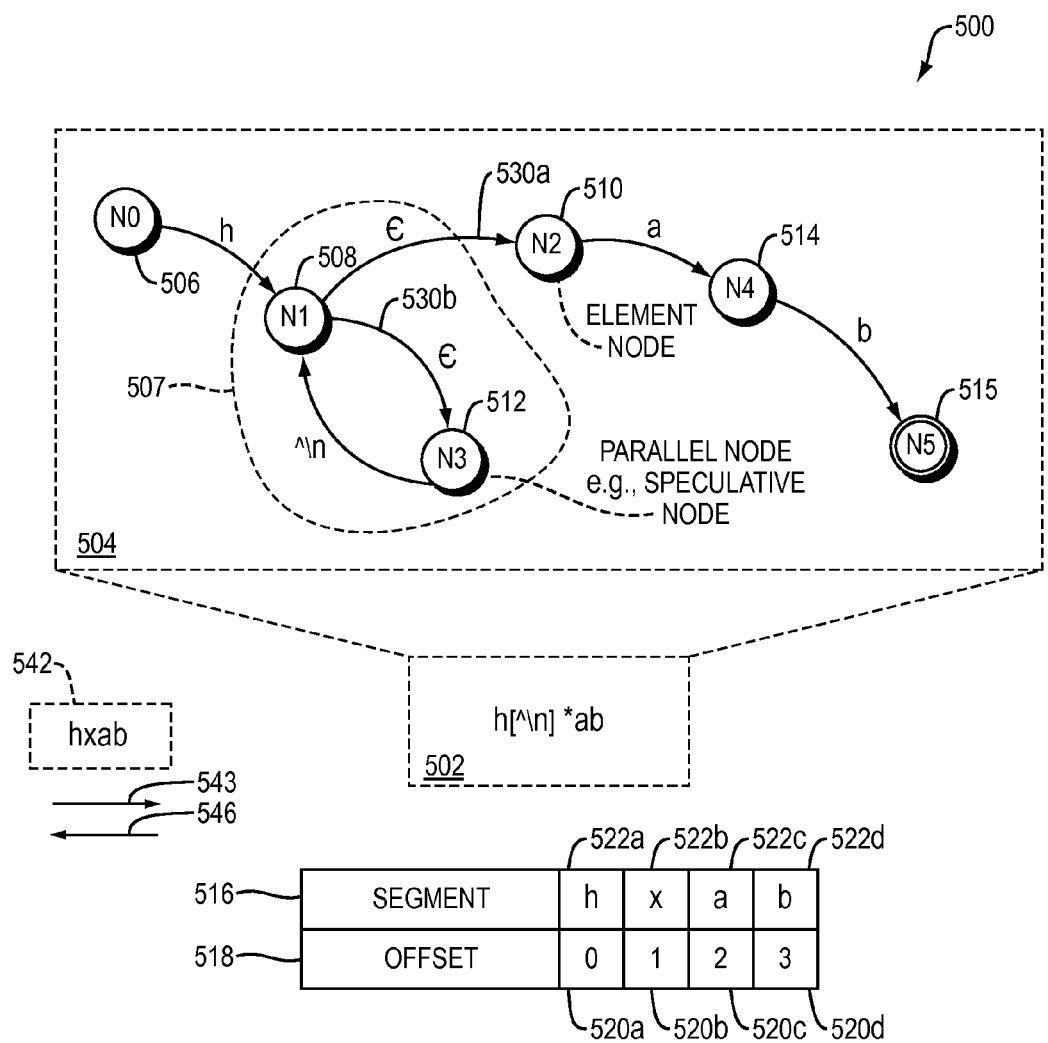
FIG. 5A is a block diagram of an example embodiment of non-deterministic finite automata (NFA) graph that may be used by a walker to match a regular expression pattern in an input stream.

FIG. 5A is a block diagram 500 of an example embodiment an NFA graph 504 that may be used by the walker 320 to match a regular expression pattern 502 in an input stream (not shown). As disclosed above, the HNA 108 may be configured to implement functionality of the walker 320 with respect to NFA processing.

In the example embodiment, the input stream may include a packet (not shown) with a payload 542. The regular expression pattern 502 is a pattern "h[^\n]*ab" that specifies the character "h" followed by an unlimited number of consecutive characters not matching a newline character (i.e., [^\n]*). The unlimited number may be zero or more. The pattern 502 further includes the characters "a" and "b" consecutively following the unlimited number of characters not matching the newline character. In the example embodiment, the payload 542 includes segments 522a-d (i.e., h, x, a, and b), with respective offsets 520a-d (i.e., 0, 1, 2, and 3) in the payload 542.

It should be understood that the regular expression pattern 502, NFA graph 504, payload 542, segments 522a-d, and offsets 520a-d represent examples used for illustrative purposes and that the system, methods, and corresponding apparatus disclosed herein may apply to any suitable regular expression pattern, NFA graph, payload, segments, and offsets. Further, it should be understood that the NFA graph 504 may be a sub-section of a larger NFA graph (not shown). In addition, the payload 542 may a portion of a larger payload (not shown) and the portion may be at the beginning, end, or any location of the larger payload, resulting in offsets different from those in the example embodiment.

In the example embodiment, the NFA graph 504 is configured to match the regular expression pattern 502 to the input stream. For example, the NFA graph 504 may be a graph including a plurality of nodes generated by the compiler 306, such as nodes N0 506, N1 508, N2 510, N3 512, N4 514, and N5 515. The node N0 506 may represent a starting node for the pattern 502, and the node N5 515 may represent a marked node for the pattern 502. The marked node N5 515 may be associated with an indicator that reflects a final (i.e., entire or complete) match of the pattern 502 matched to the input stream. As such, the walker 302 may determine that the pattern 502 is matching in the input stream based on traversing the marked node N5 515.

According to embodiments disclosed herein, the walker 320 may walk the segments 522a-d of the payload 542 one segment at a time through the NFA graph 504 to match the regular expression pattern 502 to the input stream. A given segment of the segments 516 for walking a given node may be determined based on its respective offset of the offsets 518 being a current offset within the payload 542. According to embodiments disclosed herein, the walker 320 may update the current offset by incrementing or decrement the current offset. For example, the walker 320 may walk the NFA graph 504 in a forward or reverse direction, and, thus, may walk segments from the payload 542 in a forward 543 or a reverse 546 direction, by respectively incrementing or decrementing the current offset.

The nodes N0 506, N2 510, N3 512, and N4 514, may be configured to match a respective element to a given segment of the payload 542, whereas nodes N1 508 and N5 515 may be nodes of a node type indicating no matching functionality, and, thus, would not process from the payload 542. In the example embodiment, node N1 508 is split node presenting multiple transition path options to the walker 320. For example, walking the split node N1 508 presents epsilon paths 530a and 530b. According to embodiments disclosed herein, the walker 320 may select a given path of the multiple paths 530a and 530b based on an implicit setting that is in mutual agreement with the walker 320. For example, the compiler 306 may generate the NFA graph 504 based on an implicit understanding that the walker 320 follows a deterministic path, for example, with the implicit understand that the walker 320 selects an upper epsilon path 530a based on walking the split node 508. According to embodiment disclosed herein, the upper epsilon path 530a may be selected as the upper epsilon path 530a represents a lazy path. The lazy path may be the path representing the shortest possible match of elements.

According to embodiments disclosed herein, the split node 508 may be associated with split node metadata (not shown) to present the multiple path options. For example, the split node metadata may indicate, either directly or indirectly, multiple next nodes, such as the nodes N2 510 and N3 512, in the example embodiment. If the multiple next nodes are indicated directly, the metadata may include absolute addresses or pointers to the next nodes N2 510 and N3 512. If the multiple next nodes are indicated indirectly, the metadata may include indices or offsets that may be used to resolve absolute addresses for or pointers to the next nodes N2 510 and N3 512. Alternatively, other suitable forms for directly or indirectly indicating the multiple next nodes may be used.

The implicit understanding may include configuring the walker 320 to select a given next node of multiple next nodes based on node metadata included in a particular entry location within the split node metadata. The compiler 306 may be configured to generate the split node metadata including an indication of the given next node at the designated entry location. As such, the implicit understanding that a given path, such as the upper epsilon path 530a, will be selected by the walker 320 at the split node N1 508 may be used by the compiler 306 generating the NFA graph 504.

FIG. 5B is a table 538 of an example embodiment of processing cycles for walking the NFA graph of FIG. 5A with a payload 542 in a lazy non-speculative manner. It should be understood that a processing cycle may include one or more clock cycles.

As shown in the table 538, the processing cycles 540a-h may include walking a current node 530 with a segment from the payload 542 at a current offset 532 to determine a match result 534 and walker action 536 based on the match result 534. In the example embodiment, the node N0 506 may have a character node type. For example, the node N0 506 may be a character node that is configured to match the character "h" in the input stream. In the example embodiment, the walker 320 may walk the starting node N0 506 with the segment 522a (i.e., "h") at the current offset 520a in the processing cycle 540a.

The walker 320 may determine that the match result 534 is a positive match result as the segment 522a matches character "h" at the node N0 506. As specified by the compiler 306 via metadata (not shown) associated with the starting node N0 506, the walker 320 may walk in a forward direction and fetch the next node indicated by the metadata associated with the node N0 506 and may increment the current offset from 520a (i.e., "0") to 520b (i.e., "1"). The next node indicated by the node N0 506 is the split node N1 508 in the example embodiment. As such, the walker 320 takes the action 536 for the processing cycle 540a that includes updating the current offset to "1" in the payload 542 and transitioning to the split node N1 508. Transitioning may include fetching (also referred to herein as loading) the split node N1 508.

As the split node N1 508 presents multiple transition path options, such as the epsilon paths 530a and 530b, the action 536 for the processing cycle 540b may include selecting the upper epsilon path 530a and fetching the node N2 510 independent of the payload 542 and without consuming (i.e., processing) from the payload 542. Since no matching function is performed by the split node N1 508, the current offset/segment 532 are unchanged, and, thus, payload is not processed for the processing cycle 540b.

Since the split node N1 508 presents multiple path options, the action 536 may include storing unexplored context, such as by storing an indirect or direct identifier of the node N3 512 and the current offset 520b (i.e., "1"). The selected transition path may be referred to herein as the current or active thread and each untraversed transition path that is stored may be referred to herein as a stored thread. Each thread may be identified by a corresponding node identifier and offset in a payload. As such, the unexplored context may identify an unexplored thread (i.e., path).

Storing the unexplored context may enable the walker 320 to remember to return to the node N3 512 to walk the node N3 512 with the segment "1" at the offset 520b in the payload 542 in an event a negative match result occurs along the selected partially matching path, for example, if the negative match result is determined at the node N2 510 or nodes along a path extending from the node N2 510. According to embodiments disclosed herein, the unexplored context may be marked with a Discard Unexplored Processing (DUP) indicator that indicates to the walker 320 whether to discard or process the unexplored context in an event a final match for the pattern 502 is identified along the selected transition path.

For example, based on reaching the marked node N5 515 that indicates the final (i.e., complete or entire) match for the pattern 502 in the input stream, the walker 320 may utilize the DUP indicator to determine whether to process the unexplored context by walking the node N3 512 with the segment "x" at the offset 520b in an effort to determine another path of the NFA graph 504 that matches the pattern 502, or whether to discard the unexplored context. Marking the unexplored context with the DUP indicator may include marking the unexplored context in any suitable manner, such as by setting a bit or field associated with the unexplored context to true, to signify desired processing of the stack entry, or false to signify a desired discard of the stack entry.

Whether or not a stored thread is traversed may be determined by the compiler 306. For example, the compiler 306 may control whether or not the DUP indicator is set by configuring a setting in corresponding metadata for each node. Alternatively, the compiler 306 may configure a global setting included in global metadata associated with the finite automata, specifying that all stored threads are to be traversed, enabling all possible matches to be identified.

In the example embodiment, the selection of the epsilon transition path 530a may result in detecting a match failure at the node N2 510 or at a subsequent node, such as N4 514, of the current thread. As such, if a match failure is detected, the stored thread for the epsilon transition path 530b may then be traversed. Alternatively, if specified by the compiler 306, the epsilon transition path 530b may be traversed regardless of whether or not traversing the epsilon transition path 530b results detection of a match failure.

Storing the untraversed transition path may include pushing an entry on a stack, such as the run stack 460 of FIG. 4, by storing an identifier of the next node N3 513 in association with an indication of the current offset 522b in the entry. The identifier of the next node N3 513 may be a value, pointer, or any other suitable indicator of the next node. The value of the offset may be a numeric value, pointer, or any other suitable value identifying locations of segments 516 within the payload 542.

According to the example embodiment, based on selecting the upper path (i.e., the epsilon transition path 530a) the walker 320 may fetch node the N2 510 and try to match the segment 522b (i.e., "x") at the current offset 520b (i.e., "1") to the element "a" of the node N2 510 in the processing cycle 540c. Since "x" does not match element "a" at the node N2 510, the action 536 for the processing cycle 540c may include popping an entry from the run stack 460. The entry popped 544b may be a most recently popped entry, such as a stored entry 544a indicating the node N3 512 and offset 520b (i.e., "1") in the example embodiment.

The walker 320 may transition and walk the node N3 512 and with the segment "x" located at the offset 520b in the payload 542. As such, the processing cycle 540d shows the match result 534 is positive for processing cycle 540d. The action 536 for the processing cycle 540d may include updating the current offset to the offset 520c and transitioning back to the split node N1 508 that may be a next node indicated by the node N3 512.

Since all arcs transitioning from the split node 508 are epsilon transitions, the walker 320 may again select a path of the multiple path options and does not consume (i.e., process) from the payload 542 as the current offset is not updated for the processing cycle 540e. In the example embodiment, the walker 320 again selects the epsilon transition path 530a. As such, the walker 320 again stores a thread by pushing node N3 512 and the current offset, now 520c (i.e., "2"), on the run stack 460. As shown for processing cycle 540f, the walker 320 fetches node N2 510 and matches the segment 522c (i.e., "a") at offset 520c (i.e., "2") to the element "a" of the node N2 510. Since "a" matches at the node N2 510, the walker 320 updates the current offset to 520d (i.e., "3") and transitions to the node N4 514 that is specified by the node N2 510 metadata as configured by the compiler 306.

As such, for the processing cycle 540g, the walker 320 may fetch the next node N4 514 and the next segment 522d (i.e., "b") at the offset 520d. Since "b" matches at the node N4 514, the walker 320 may transition to the next node N5 515. The node N5 515 is a marked node associated with an indicator signifying a final (i.e., complete or entire) match of the regular expression pattern 542 in the input stream. Thus, for the processing cycle 540h the walker 320 may discontinue the walk along the current path and report the final match by storing an entry in the match result buffer 466. The walker 320 may then check the run stack 460 for stored threads and either discard the stored threads or activate them as indicated by the corresponding DUP indicator. As such, the walker 320 pops the entry that identifies the node N3 512 and the offset 520 (i.e., "2"), and determines whether to activate the stored thread by walking the node N3 512 with the segment 522c at the offset 520c or discard the stored thread according to the DUP indicator associated with the popped entry.

As shown in the table 538 of FIG. 5B, a number of processing cycles for matching the payload 542 to the pattern 502 is eight, and the walker 320 pushed and popped unexplored context in order to remember and return to the node N3 512 twice. Further, the table 538 shows that walking the NFA graph 504 with the payload 542 in a non-speculative manner results in processing the segment "x" in two processing cycles, at the nodes N2 510 and N3 512. According to embodiments disclosed herein, such performance may be improved by reducing a number of processing cycles needed for the matching, reducing a number of times a segment may be processed and reducing a number of times memory is accessed for push and pop operations needed to store and retrieve unexplored context.

Performance optimization gained from embodiments disclosed herein may be based on an observation that a given segment at a given offset may be processed by at least two nodes in an NFA and that for a majority (e.g., 99%) of the time that the given segment at the given offset is processed by the at least two nodes, the given segment fails to match at a first node of the at least two nodes and matches at a second node of the at least two nodes. For example, in the example embodiment of FIG. 5A, as disclosed above with reference to the table 538 of FIG. 5B, the segment 522b (i.e., "x") at the given offset 520b (i.e., "1") is processed by both nodes N2 510 and N3 512 and does not match at the node N2 510 but does match at the node N3 512.

According to embodiments disclosed herein, match performance may be optimized by processing the segment at the given offset at each node of the at least two nodes in parallel. Processing the at least two nodes in parallel may be referred to herein as speculative processing. Embodiments disclosed herein may be based on the assumption that a matching operation at a selected node of at least two nodes will result in a mismatch. The selected node of the at least two nodes may be referred to herein an element node. A non-selected node of the at least two nodes, that would be traversed based on a mismatch at the selected node, may be referred to herein as a parallel node, and may be processed, speculatively, in a same processing cycle with the same segment being processed by the selected node, to improve match performance. As described in reference to FIG. 5D, below, both the node N2 510 and the node N3 512 may be processed with the segment "x" at the given offset 520b, optimizing match performance by walking the segment "x" at the given offset 520b, speculatively, at the node N3 512, in a same processing cycle as the segment "x" at the given offset 520b is walked at the node N2 510.

FIG. 5C is a block diagram of an example embodiment of a table 570 of lazy speculative processing rules 578a-d. The table 570 is a truth table with actions 576 that are based on the element node match results 574 and the parallel node match results 572. Four possible cases are shown, corresponding to the lazy speculative processing rules 578a-d. For example, the lazy speculative processing rules 578a, 578b, 578c, and 578d, each have a respective subsequent action 576 based on match results positive/positive, positive/negative, negative/positive, and negative/negative, respectively. The subsequent action 576 may be based on an aggregation of the match result of the parallel node 572 and the match result at the element node 574.

The speculative processing rule 578b may be of particular interest as it optimizes match performance by matching at the element node and the parallel node, in parallel, as the action 576 indicates updating the offset and no transition. As such, the speculative processing rule 578b enables the element node and the parallel node to process a next segment, in parallel, obviating memory access for node fetching.

The subsequent action 576 is directed to providing the subsequent action for the element node if the match result for the element node is positive, as the parallel node was processed speculatively. For example, if the match result at the element node is positive, the subsequent action 576 includes updating the current offset in the payload and transitioning to a next node, the next node being specified by metadata associated with the element node. If the match result for the element node is positive then the match result for the parallel node is used to determine whether or not the subsequent action 576 includes a push of the parallel node and the current offset in order to store unexplored context.

For example, speculative processing entry 578a pushes an entry to the run stack 460 to enable the walker 320 to return to the parallel node with a segment at the current offset because returning may yield another partially matching thread in the NFA graph. However, if the match result at the parallel node is a negative match result, as is the case for the lazy speculative processing rule 578c, then unexplored context is not pushed on the stack as returning to the parallel node with the segment at the current offset would not advance a partial match of the pattern. As such, performance of matching may be optimized by the lazy speculative processing rule 578c as well, since the lazy speculative processing rule 578c obviates at least one set of push and pop operations for the matching.

As shown by the lazy speculative processing rule 578d, based on the aggregation of the match result of the parallel node 572 and the match result of the element node 574 including a negative match result at each node, the at least one subsequent action may include discontinuing the walk of a given path. A next segment, at a next given offset within the payload, may walked based on sensing unexplored context, such as by checking the run stack 460 for a stored thread and popping the stored thread if stored. The method may terminate the walk based on not sensing the unexplored context.

As shown by lazy speculative processing rules 578a and 578c, based on the aggregation of the match result of the element node 574 including a positive match result for the segment at the element node and the match result of the parallel node 572 including a positive match result or a negative match result for the segment at the parallel node, the at least one subsequent action includes updating the given offset to produce a next offset and transitioning to a next node. The next node may be identified based on metadata associated with the element node. As such the next node may be walked with a next segment, at the next offset within the payload. As shown by the lazy speculative processing rule 578a, based on the positive match result for the segment at the parallel node, the least one subsequent action may further include storing an unexplored context in a stack entry and pushing the stack entry onto a stack. The unexplored context identifying, either directly or indirectly, the parallel node and the given offset.

FIG. 5D is a table 550 of an example embodiment of processing cycles 554a-f for traversing the NFA graph 504 of FIG. 5A with the payload 542 in a lazy speculative manner. As shown in the table 550, processing cycles 554a-f may include traversing a current node 530' with a segment from the payload 542 at a current offset 532' to determine a match result 534' and walker action 536' based on the match result 534'. According to embodiments disclosed herein, the walker 320 may process both the node N2 510 and the node N3 512, in parallel, with a given segment at a given offset in the payload 542, optimizing the match performance using the lazy speculative processing rules disclosed in FIG. 5C. For example, as disclosed below, the processing cycles 554c and 554d may determine the walker action 536' based on an aggregation of the match results for N2 510 and the node N3 512.

Similar to the embodiment of FIG. 5B, disclosed above, the walker 320 may walk the starting node N0 506 with the segment 522a (i.e., "h") at the current offset 520a (i.e., "0"). The walker 320 may determine that the match result 534' is a positive match result as the segment 522a matches character "h" at the node N0 506. Similar to the embodiment of FIG. 5B, the next node indicated by the node N0 506 is the split node N1 508. As such, the walker 320 takes the action 536' for the processing cycle 554a that includes updating the current offset to 520b (i.e., "1") in the payload 542 and transitioning to the split node N1 508. Transitioning may include fetching (also referred to herein as loading) the split node N1 508.

According to the example embodiment of FIG. 5D, the split node metadata associated with the split node 508 may include a speculative processing indicator. If the speculative processing indicator is not included in the split node metadata, the walker 320 may continue as in the example embodiment of FIG. 5B. Including the speculative processing indicator may include setting a field or other suitable data in the split node metadata. Setting the field may include configuring the field to true to indicate speculative processing and configuring the field to false to indicate non-speculative processing. Including the speculative processing indicator may be performed in any suitable manner that enables the walker 320 to walk at least two nodes of the NFA graph 504 that are to be processed speculatively (i.e., in parallel).

According to the example embodiment of FIG. 5D, if the split node metadata includes the speculative processing indicator, no segment from the payload is processed for the processing cycle 554b, however the walker 320 fetches both node N2 510 and node N3 512. The node N2 510 may be referred to as the element node and the node N3 512 may be referred to as the parallel node, or a speculative node in the example embodiment, as node N3 512 is being speculatively processed (i.e., walked).

As shown for processing cycle 554c, the walker 320 may determine a negative match result for the segment 522b (i.e., "x") at the element node N2 510 and a positive match result at the parallel node N3 512. An aggregation of such match results maps to the lazy speculative processing rule entry 578b of FIG. 5C. As such, the subsequent action 576 of the lazy speculative processing rule entry 578b specifies that the current offset be updated and that the element and parallel nodes N2 510 and N3 512, respectively, be processed again. As the nodes N2 510 and N3 512 were already fetched for processing cycle 554c, no node fetch is needed for the processing cycle 554d.

As shown for processing cycle 554d, the walker 320 walks the element node N2 510 and the parallel node N3 512 with the segment 522c (i.e., "a") at the updated offset which is the offset 520c (i.e., "2"). The match result 534' is positive at both the element node N2 510 and the parallel node N3 512 as the segment "a" matches the element "a" at node N2 510 and also matches the "^\n" element at node N3 512, as "a" is not a newline character. As such, an aggregation of the positive match results 534' for the processing cycle 554d map to the lazy speculative processing rule entry 578a of FIG. 5C. Thus, unexplored context indicating the parallel node N3 512 and the current offset 520c (i.e., "2") may be pushed on the run stack 460, and a next node specified by the metadata of the element node may be fetched.

According to the example embodiment, the current offset may be updated to 520d (i.e., "3") and the node N4 514 may be fetched transitioning the walker 320. A positive match result for the segment 522d (i.e., "b") may be determined for the processing cycle 554e at the node N4 514 and the walker 320 may fetch the marked node N5 515, transitioning to the marked node N5 515 that may be specified as a next node for the node N4 514 in metadata associated with the node N4 514. Since the node N5 515 is a marked node, the walker may store the final match result to the match result buffer 466 and discontinue walking the active thread (e.g., the current path) and activating a stored thread if the run stack 460 is non-empty.

For example, walker 320 may check the run stack 460 for an empty status. In the example embodiment the run stack 460 is non-empty as unexplored context was pushed to the run stack 460 in the processing cycle 554d. As such, the walker 320 may pop the unexplored context that indicates advancing the walk to the parallel node N3 512 with the segment 522d (i.e., "b") at the offset 520d (i.e., "3") and may determine whether to discard the unexplored context or process the unexplored context based on the DUP indicator associated with the stack entry, as disclosed above. As shown in the table 550 of the example embodiment, the number of processing cycles for matching the payload 542 to the pattern 502 is six, which is a reduced number as compared with the eight processing cycles used in the example embodiment of FIG. 5B.

Figure 6A:
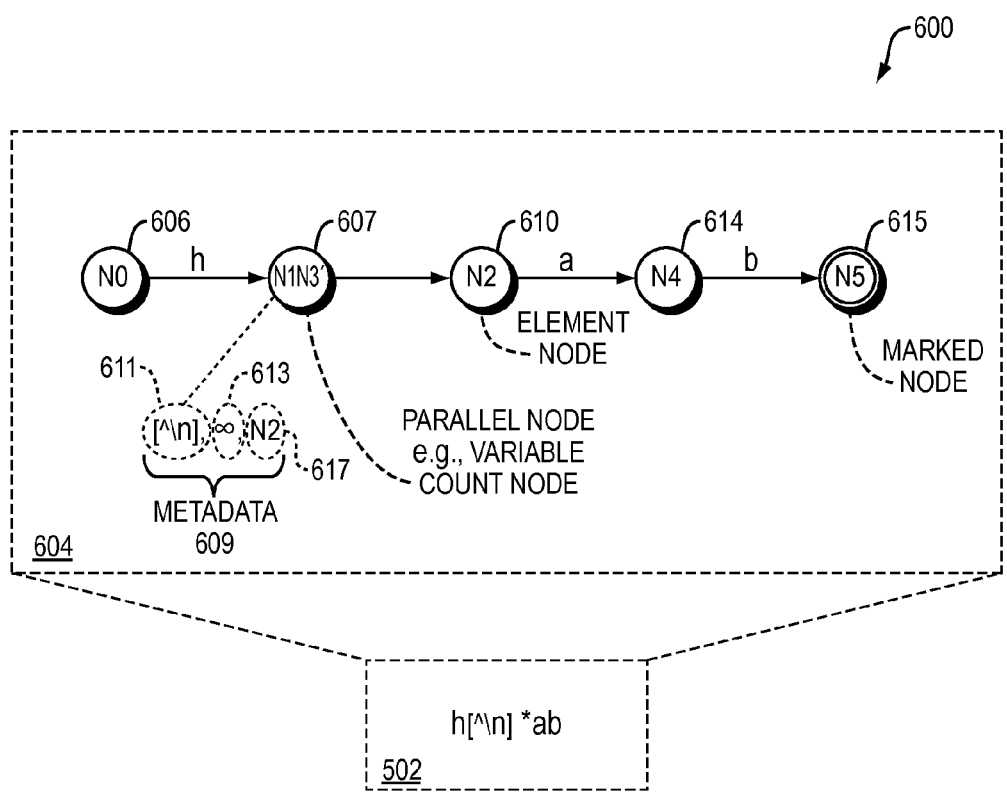
FIG. 6A is a block diagram of another example embodiment of an NFA graph that may be used by the walker to match the regular expression pattern in the input stream.

FIG. 6A is a block diagram 600 of an NFA graph 604 that may be used by the walker 320 to match the regular expression pattern 502 in the input stream. In the example embodiment, a section 507 of FIG. 5A, including the split node N1 508, speculative node N3 512, and epsilon transition paths 530a and 530b, is represented by a variable count node N1N3 607. The variable count node N1N3 607 is an aggregation of the split node N1 508 and the parallel (i.e., speculative) node N3 512 of FIG. 5A.

According to embodiments disclosed herein, the variable count node N1N3' 607 may be configured to identify a given element, such as the character class 611 (i.e., [^\n]), a variable number of instances 613, such as infinite, as indicated by the variable count node. The variable number of instances 613 may be at least zero times or any other suitable number of instances. It should be understood that the given element character class 611 is for illustrative purposes of the example embodiment and that the given element may be any suitable element being matched by the variable count node N1N3'.

A variable count node is a node that may match an element a variable number of times, the number of times may be defined by a range (e.g., zero to five times). A variable count node may be one of four types of variable count nodes: a lazy, greedy, possessive, or all match node. The variable count lazy node may be configured to find a shortest possible match of elements within the range. A variable count greedy or possessive node may be configured to find the longest possible match of elements within the range. A variable count all match node may be configured to return all matches in the payload.

The variable count lazy node may be configured to process (i.e., consume) a single instance of a segment from the payload based on a mismatch of a segment at a next node identified by metadata associated with the variable count lazy node. The variable count greedy node may be configured to process consecutive segments from the payload until a mismatch of one of the consecutive segments is determined at the variable count greedy node or until the variable count greedy node has processed (i.e., consumed) the total number of the variable number of consecutive segments.

In the example embodiment of FIG. 6A, the variable count node N1N3' 607 is a variable count lazy node associated with metadata 609 identifying, either directly or indirectly, a next node 617, such as the element node N2 610. In the example embodiment, the walker advances the walk to the element node N2 610, based on zero or more matching instances, of the variable number of consecutive instances 613, of the given element 611 in the input stream. For example, in the example embodiment, the variable count lazy node N1N3' 607 is configured to match zero or more instances of the character class element "^\n" (i.e., not a newline character) an infinite number of times.

According to embodiments disclosed herein, each node of the NFA may be associated with metadata that includes at least four fields, such as a node type, element, count, and next node, although one or more of the at least four fields may not be applicable based on the node type.

The metadata 609 associated with the variable count lazy node N1N3' 607 may include a count (not shown) for tracking a total number (not shown) of consecutive instances of the element 611 positively matching in the payload to enable a comparison of the total number to the variable number 613.

According to embodiments disclosed herein, the walker 320 may be configured to walk the NFA graph 604 in a speculative manner to optimize performance of a match of the regular expression pattern 502 in the input stream.

FIG. 6B is a table 618 of an example embodiment of processing cycles 628a-g for traversing the NFA graph 604 of FIG. 6A in a lazy non-speculative manner with the payload 542. Similar to the embodiments of FIG. 5A and FIG. 5B, disclosed above, the walker 320 may walk the starting node N0 606 with the segment 522a (i.e., "h") at the current offset 520a (i.e., "0"). The walker 320 may determine that the match result 624 is a positive match result for the processing cycle 628a as the segment 522a matches character "h" at the node N0 606. In the example embodiment of FIG. 6A, a next node indicated by the node N0 606 is the variable count lazy node N1N3' 607. As such, the walker 320 takes the action 626 for the processing cycle 628a that includes updating the current offset to 520b (i.e., "1") in the payload 542 and transitioning to the variable count lazy node N1N3' 607. Transitioning may include fetching (also referred to herein as loading) the variable count lazy node N1N3' 607.

Since variable count lazy node N1N3' 607 is lazy, the action 626 for the processing cycle 628b may include storing the unexplored context, such as by storing an indirect or direct identifier of the node N1N3' 607 and the current offset 520b (i.e., "1") and advancing to the next node 617 identified by the variable count lazy node N1N3' 607 without updating the current offset. As such, no payload is processed by the variable count lazy node N1N3' 607 for the processing cycle 628a.

Storing the unexplored context may enable the walker 320 to remember to return to the variable count lazy node N1N3' 607 to walk the variable count lazy node N1N3' 607 with the segment "x" at the offset 520b in the payload 542 in an event a negative match result occurs along the selected partially matching path, for example, if the negative match result is determined at the node N2 610 or nodes along a path extending from node N2 610. To store the unexplored context, the walker 320 may push 630a an entry on the run stack 460 that includes an identifier for the variable count lazy node N1N3' 607 and the offset 520b.

According to embodiments disclosed herein, the unexplored context may be marked with the DUP indicator that indicates to the walker 320 whether to discard or process the pushed unexplored context in an event a final match for the pattern 502 is identified along the selected transition path. For example, based on reaching the marked node N5 615 that indicates the final (i.e., complete or entire) match for the pattern 502 in the input stream, the walker 320 may utilize the DUP indicator of the pushed stack entry to determine whether to process the unexplored context by walking the variable count lazy node N1N3' 607 with the segment "x" at the offset 520b in an effort to determine another path of the NFA graph 604 that matches the pattern 502, or whether to discard the unexplored context as only a single matching path of the pattern 502 in the input stream is of interest.

According to the example embodiment of FIG. 6B, the walker 320 may fetch the node N2 610 and may try to match (i.e., search for) the segment 522b (i.e., "x") at the current offset 520b (i.e., "1") in the processing cycle 628c to the element "a" of the node N2 610. Since "x" does not match the element "a" at the node N2 610 the action 626 for the processing cycle 628c may include popping 630b an entry from the run stack 460. The entry popped may be a most recently popped entry, such as the recently pushed 630a entry indicating the variable count lazy node N1N3' 607 and the offset 520b (i.e., "1").

The walker 320 may transition and walk the variable count lazy node N1N3' 607 with the segment "x" located at offset 520b in the payload 542. Since "x" is not a newline character, "x" is a positive match at the variable count lazy node N1N3' 607 and the processing cycle 628d shows the match result 624 is positive for the processing cycle 528d. The action 618 for the processing cycle 528d may include updating the current offset to offset 520c and transitioning back to the element node N2 610 that may be the next node indicated by the metadata 609 associated with the variable count lazy node N1N3' 607.

As shown for processing cycle 628e, the walker 320 fetches the node N2 610 and compares the segment 522c (i.e., "a") at the offset 520c (i.e., "2"). Since "a" is a positive match at the element node N2 610, the walker 320 updates the current offset to 520d (i.e., "3") and transitions to the node N4 614.

As such, for the processing cycle 628f, the walker 320 may fetch the node N4 614 and the segment 522d (i.e., "b") at offset 520d. Since "b" is a positive match at the node N4 614, the walker 320 may transition to the node N5 615. The node N5 615 is a marked node associated with an indicator signifying a final (i.e., complete or entire) match of the regular expression pattern 542 in the input stream. Thus, for the processing cycle 628g, the walker 320 may discontinue the walk and report the final match by storing an entry in the match result buffer 466. The walker may then check the run stack 460 for stored threads and either discard the stored threads or activate them as indicated by the corresponding DUP indicator of the entries in the run stack 460.

As shown in the table 618 of FIG. 6B, a number of processing cycles for matching the payload 542 to the pattern 502 is seven, and the walker 320 pushed 630a and popped 630b unexplored context in order to remember and return to the variable count lazy node N1N3' 607 with the segment "x" at the offset 520b. As such, table 618 also shows that the segment "x" was processed (i.e., consumed) by the walker 320 at both the variable count lazy node N1N3' 607 and the node N2 610, and was a mismatch (i.e., negative match) at the node N2 610 and a positive match at the variable count lazy node N1N3' 607.

According to embodiments disclosed herein, such match performance may be improved by reducing a number or processing cycles needed for the matching, by reducing a number of processing cycles on which a given segment is processed and reducing a number of times memory is accessed by reducing a number of push and pop operations for storing and retrieving unexplored context. Similar to the walk disclosed above for FIG. 5D, embodiments disclosed herein may walk the NFA graph 604 in the speculative manner.

For example, the walker 320 may be configured to walk at least two nodes of the NFA 604, in parallel, with a given segment, at a given offset within the payload 542. The walker 320 may determine a match result for the segment, at the given offset within the payload, at each node of the at least two nodes. The walker 320 may determine at least one subsequent action for walking the NFA graph 604, based on an aggregation of each match result determined.

FIG. 6C is a table 648 of another example embodiment of processing cycles 658a-e for traversing the NFA graph 604 of FIG. 6A in a lazy speculative manner with the payload 542. As shown in the table 648, processing cycles 658a-e may include traversing a current node 650 with a segment from the payload 542 at a current offset 652 to determine a match result 654 and walker action 656 based on the match result 654. According to embodiments disclosed herein, the walker 320 may process both node the variable count lazy node N1N3' 607 and the element node N2 610, in parallel, with a given segment at a given offset in the payload 542, optimizing the match performance using the lazy speculative processing rules disclosed above in reference to FIG. 5C.

According to the example embodiment of FIG. 6C, the metadata 609 associated with the variable count lazy node N1N3' 607 may include a speculative processing indicator (not shown). If the speculative processing indicator is not included in the variable count lazy node metadata, the walker 320 may continue as in the example embodiment of FIG. 6B.

Including the speculative processing indicator may be performed in any suitable manner that enables the walker 320 to walk at least two nodes of the NFA graph 604 that are to be processed in a speculative manner. The at least two nodes processed in parallel may include an element node and a parallel node. In the example embodiment, the node N2 610 may be referred to as the element node and the variable count lazy node N1N3' 607 may be referred to as the parallel node.

According to the example embodiment of FIG. 6C, if the variable count lazy node metadata includes the speculative processing indicator, the segment corresponding to the current offset in the payload may be processed for the processing cycle 658b and the walker 320 may fetch both node the element node N2 610 and the variable count lazy node N1N3' 607. As shown for processing cycle 658b, the walker 320 may determine a negative match result for the segment 522b (i.e., "x") at the element node N2 610 and a positive match result at the parallel node N1N3' 607. An aggregation of such match results maps to the lazy speculative processing rule entry 578b. As such, the action 576 specifies that the current offset be updated and that the element and parallel nodes, such as nodes N2 610 and N1N3' 607, respectively, be processed (i.e., walked) again. As the nodes N2 610 and N1N3' 607 were already fetched for the processing cycle 658b, no node fetch is needed for the processing cycle 658c.

As shown for the processing cycle 658c, the walker 320 walks the element node N2 610 and the parallel node N1N3' 607 with the segment 522c (i.e., "a") at the updated offset which is offset 520c (i.e., "2") in the payload 542. The match result 654 is positive at both the element node N2 610 and the parallel node N1N3' 607 as the segment "a" matches the element "a" at the element node N2 610 and also matches the "^\n" element at the parallel node N1N3' 607, as "a" is not a newline character.

An aggregate of the positive match results of the match results 654 for the processing cycle 658c map to the lazy speculative processing rule entry 578a. Thus, unexplored context indicating the parallel node N1N3' 607 and the current offset 520c (i.e., "2") may be pushed on the run stack 460, and a next node specified by the metadata of the element node 610 may be fetched. According to the example embodiment, the current offset may be updated to 520d (i.e., "3") and the node N4 614 may be fetched, as the node N4 614 is the next node indicated by the metadata of the element node N2 610.

A positive match result for the segment 522d (i.e."b") may be determined for the processing cycle 658d at the node N4 614 and the walker 320 may transition to the marked node N5 615 that may be specified as a next node for the node N4 614 in metadata associated with the node N4 614. Since the node N5 615 is a marked node, the walker may store the final match result to the match result buffer 466 and discontinue walking the active thread (e.g., the current path).

The walker 320 may check the run stack 460 for an empty status. In the example embodiment the run stack 460 is not empty as unexplored context was pushed to the run stack 460 in the processing cycle 658c. As such, the walker 320 may pop the unexplored context that indicates advancing the walk to the parallel node N1N3 607 with the segment 522d (i.e., "a") at the offset 520c (i.e., "2") and determine whether to discard the unexplored context or process the unexplored context based on the DUP indicator associated with the stack entry.

As shown in the table 648 of the example embodiment, the number of processing cycles using speculative processing for matching the payload 542 to the pattern 502 is five, which is a reduced number as compared with the seven processing cycles needed for the non-speculative processing example embodiment of FIG. 6B. It should be appreciated that such performance increases based on speculative processing as shown by the example embodiments disclosed above are for illustrative purposes and that performance gains achieved by using speculative processing may be more than those illustrated. For example, such performance gains may increase depending upon an input payload. Based on content of the input stream, further churning, such as the push 630a and pop 630b operations of FIG. 6B for transitioning from and to the parallel node may be more prevalent for different payloads, resulting in greater performance gains as described below.

FIG. 6D is a block diagram 660 of another payload 662 that may be walked with the NFA graph 604 of FIG. 6A. The input payload 662 includes segments 670 at offsets 672. Segments 674a-f correspond to segments h, x, x, x, a, and b, that map to offsets 676a-f (i.e., 0, 1, 2, 3, 4, and 5), respectively.

FIG. 6E is a table 680 of an example embodiment of processing cycles 681a-k for walking the NFA graph 604 of FIG. 6A with the payload 662 of FIG. 6D in a lazy non-speculative manner. As shown in the table 680, processing cycles 681a-k may include walking a current node 682 with a segment from the payload 662 at a current offset 684 to determine a match result 686 and a walker action 688 based on the match result 686. As shown in the example embodiment, eleven processing cycles are needed before the final match of the pattern 502 is found in the payload 662. Further, the processing cycles reflect that the unexplored context for the parallel node N1N3' 607 has been pushed and popped multiple times as the walker 320 determines a mismatching segment at the element node N2 610, causing a churn of the walker 320 between the element node N2 610 and the parallel node 607. Such churning between nodes results in the walker 320 fetching the parallel node 607 and element node N2 610 at a performance cost due to the additional processor cycles needed for the corresponding memory accesses. Such memory accesses may be expensive especially since the memories may be Error-Correcting Code (ECC) protected type memories. As such, accessing the ECC protected memory for a push or pop operation may take four clock periods or more.

FIG. 6F is a table 690 of another example embodiment of processing cycles 691a-g for traversing the NFA graph 604 of FIG. 6A with the payload 662 of FIG. 6D in a lazy speculative manner. As shown in the table 690, processing cycles 691a-g may include traversing a current node 692 with a segment from the payload 662 at a current offset 694 to determine a match result 696 and walker action 698 based on the match result 696. As shown in the example embodiment, seven processing cycles, in contrast to the eleven processing cycles 681a-k of the non-speculative processing embodiment of FIG. 6E, are needed before the final match of the pattern 502 is found in the payload 662. According to embodiments disclosed herein, the walker 320 may process both the variable count lazy node N1N3 607, that is the parallel node in the example embodiment, and the node N2 610, that is the element node in the example embodiment, in parallel, with a given segment at a given offset in the payload 662, optimizing the match performance using the lazy speculative processing rules disclosed above in FIG. 5C.

As disclosed above, the variable count node is a node that may match an element a variable number of times, the number of times may be defined by a range (e.g., zero to five times) and may be associated with a node type, such as lazy or greedy. In contrast to the variable count node with the lazy node type (i.e., a variable count lazy node), that may be configured to find a shortest possible match of elements within the range, the variable count node with the greedy node type (i.e., a variable count greedy node) may be configured to find the longest possible match of elements within the range. For example, as disclosed above, the walker 320 may be configured to select the upper epsilon path 530a to find the shortest possible match of elements within the range. However, to find the longest possible match within the range, the walker 320 may be configured to select the lower epsilon path 530b as the lower epsilon path 530b represents a greedy path.

The compiler 306 may be configured to generate split node metadata that may enable the walker 320 to select the lower epsilon path 530b to effect selection of the greedy path. As such, the walker 320 may iteratively transition between the split node 508 and the speculative node N3 512 to process consecutive segments from the input stream provided each of the consecutive segments positively matches at the speculative node N3 512. Based on negatively matching a given segment of the consecutive segments, the walker 320 may transition to the element node N2 510 via the upper epsilon path 530a, as the greedy path may be configured to process consecutive segments from the payload until a segment mismatch is determined.

Figure 7:
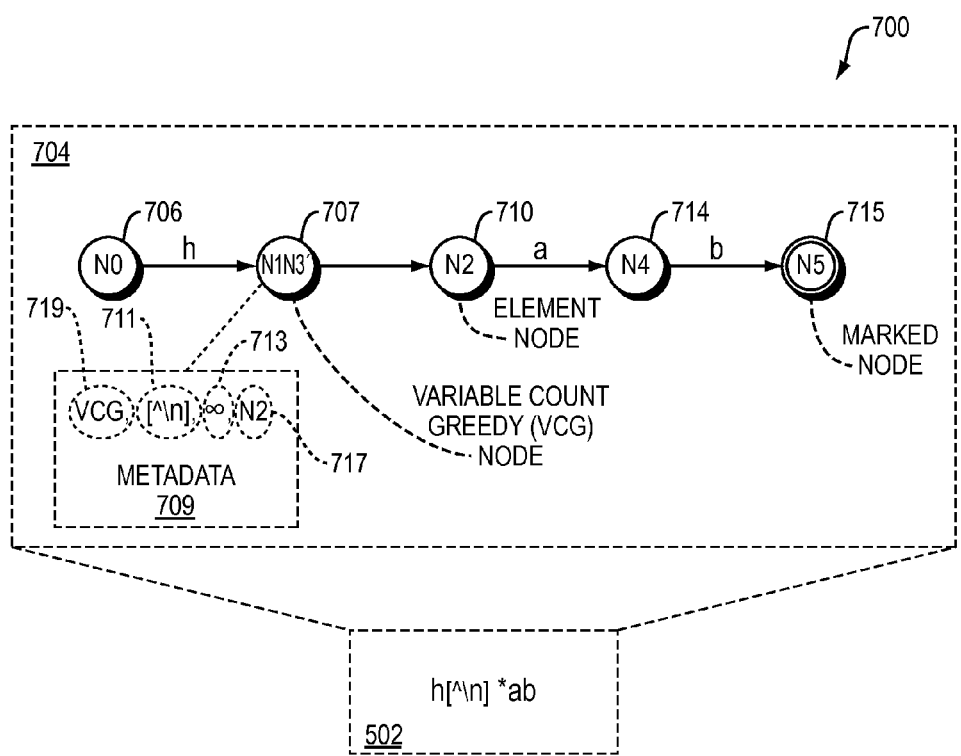
FIG. 7 is a block diagram of another NFA graph that may be used by the walker to match the regular expression pattern in the input stream.

FIG. 7 is a block diagram 700 of another NFA graph 704 that may be used by the walker 320 to match the regular expression pattern 502 in the input stream. In the example embodiment, the section 507 of FIG. 5A, including the split node N1 508, speculative node N3 512, and epsilon transition paths 530a and 530b, is represented by a variable count node N1N3' 707. In contrast to the variable count lazy node N1N3' 607 of FIG. 6A, the variable count node N1N3' 707 is a variable count greedy node in the example embodiment. A node type 719 identifying the node N1N3' 707 as a variable count greedy node may be included in metadata 709 associated with the node N1N3' 707.

The variable count greedy node N1N3' 707 may be configured to process consecutive segments at the variable count greedy node N1N3' 707 until a segment mismatch (i.e., negative match) is determined or until the variable count greedy node has processed a threshold number of positively matching consecutive segments. The threshold number may be the upper value for a range of values associated with the variable count greedy node N1N3' 707.

According to embodiments disclosed herein, the variable count greedy node N1N3' 707 may be configured to identify a given element, such as the character class element 711 (i.e., [^\n]), a variable number of instances 713 as indicated by the metadata 709 associated with the variable count greedy node N1N3' 707. The variable number of instances 713 may be at least zero times or any other suitable number of instances, such as infinite in the example embodiment. It should be understood that the given character class element 711 and variable number of instances 713 are for illustrative purposes of the example embodiment and that the given element may be any suitable element being matched by the variable count greedy node N1N3' 707 the variable number of times 713.

In the example embodiment of FIG. 7, the metadata 709 associated with the variable count greedy node N1N3' 707 identifies, either directly or indirectly, a next node 717, such as the element node N2 710. In the example embodiment, the walker 320 may transition the walk to the element node N2 710, based on having positively matched the element 711 the variable number instances 713 in the input stream or based on a segment mismatch. For example, in the example embodiment, the variable count greedy node N1N3' 707 is configured to match an infinite number of consecutive instances of the character class element "^\n" (i.e., not a newline character) in the input stream. The metadata 709 associated with the variable count greedy node N1N3' 707 may include a count value (not shown) for tracking a total number of consecutive instances of the element 711 positively matching in the payload to enable a comparison of the total number to the variable number 713. Since the variable number 713 is infinite in the example embodiment, the walker 320 may proceed to process consecutive segments from the input stream at the variable count greedy node N1N3' 707 until a newline character is processed. Optionally, a starting offset (not shown), indicating an earliest positively matching segment at the variable count greedy node N1N3' 707 may be also be included in the metadata 709 associated with the variable count greedy node N1N3' 707 and used in conjunction with the count value to determine a current offset in the payload.

Figure 8:
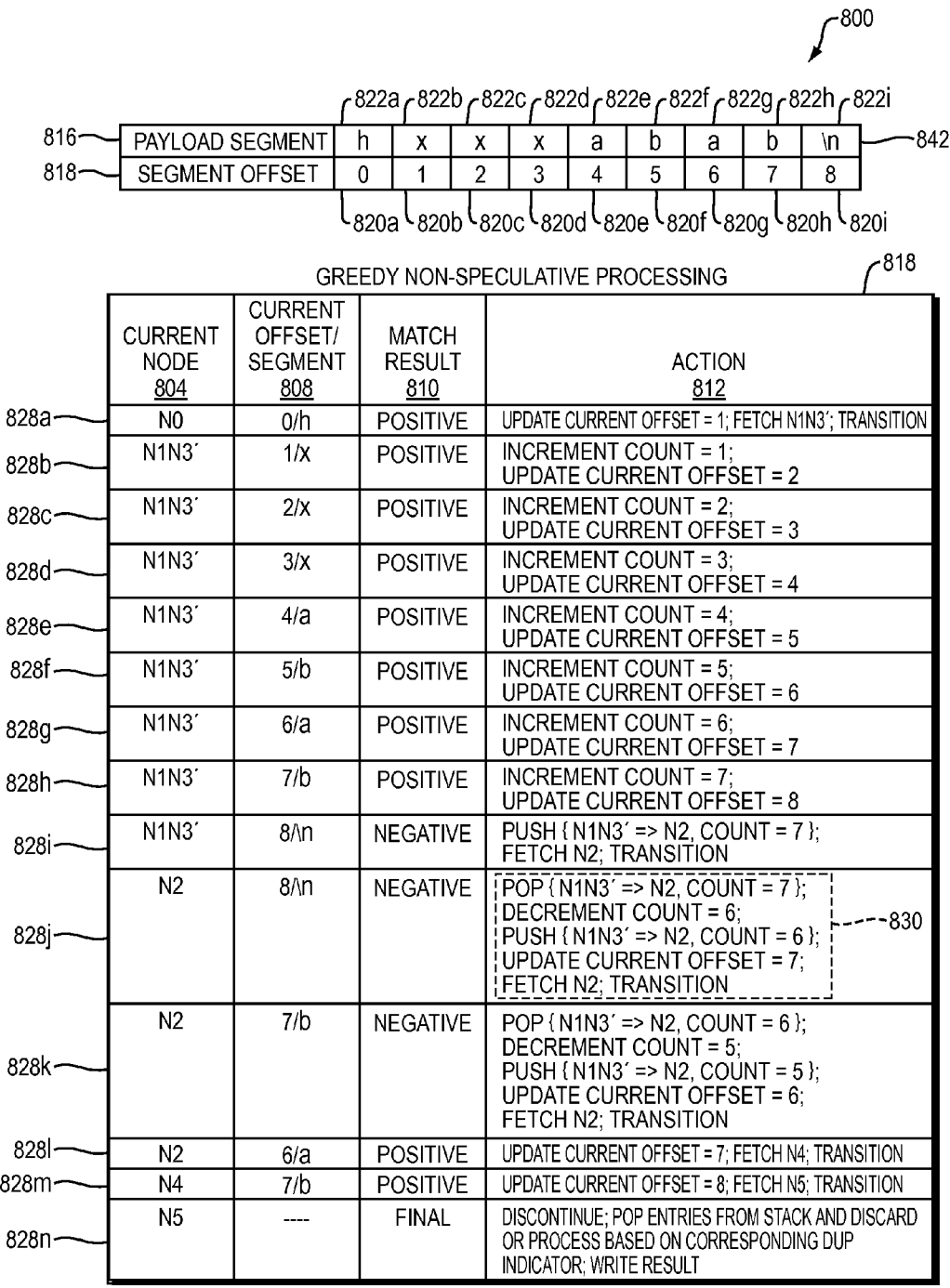
FIG. 8 is a block diagram of a payload and a table of an example embodiment of processing cycles for traversing the NFA graph of FIG. 7 in a greedy non-speculative manner with the payload.

FIG. 8 is a block diagram 800 of a payload 842 and a table 818 of an example embodiment of processing cycles 828a-n for traversing the NFA graph 704 of FIG. 7 in a greedy non-speculative manner with the payload 842. The walker 320 may walk the starting node N0 706 with the segment 822a (i.e., "h") at the current offset 820a (i.e., "0"). The walker 320 may determine that the match result 810 is a positive match result for the processing cycle 828a as the segment 822a matches character "h" at the node N0 706. In the example embodiment of FIG. 7, a next node indicated by the node N0 706 is the variable count greedy node N1N3' 707. As such, the walker 320 may take the action 812 for the processing cycle 828a that includes updating the current offset to 820b (i.e., "1") in the payload 842 and fetching and transitioning to the variable count greedy node N1N3' 707 that is a next node for the N0 706.

Since the variable count greedy node N1N3' 707 is a greedy type node, the action 812 for the processing cycles 828b-h may include incrementing a count value included in the metadata 709 associated with the variable count greedy node N1N3' 707 in each of the processing cycles 828b-h to track a total number of consecutive segments that have been positively matched at the variable count greedy node N1N3' 707. The action 812 for the processing cycles 828b-h may further include updating the current offset to a next segment offset of the segment offsets 818 to process a next segment of the segments 816 as shown by the processing cycles 828b-h. Such incrementing of the count value and updating of the current offset may be repeated until a mismatch of the payload segment at the current offset 808 is determined, as is the case shown for processing cycle 828i.

As shown in the table 818, the segment 822i at the current offset 820i negatively matches at the variable count greedy node N1N3' 707 for the processing cycle 828i. According to embodiments disclosed herein, unexplored context such as an identifier of the next node N2 710 of the variable count greedy node N1N3' 707 may be stored in conjunction with the count value of the variable count greedy node N1N3' 707 and a DUP indicator that may be set to one.

Based on the negative match result 810 for the processing cycle 828i, the walker may fetch the next node indicated, either directly or indirectly, by the metadata 709 associated with the variable count greedy node N1N3' 707 and transition to the node N2 710 to walk the node N2 710 with the segment 820i having negatively matched at the variable count greedy node N1N3' 707, in an effort to find the longest possible match.

As shown for processing cycle 828j, the segment 820i has a match result 810 that is negative at the node N2 710 as the segment "\n" does not match the element "a" of the element node N2 710. As such, the walker 320 may proceed to incrementally unroll the consecutive segments having previously positively matched at the variable count greedy node N1N3' 707. For example, the walker 320 may unroll segments 820h . . . 820b, in an effort to determine a most recently walked segment having positively matched at the variable count greedy node N1N3' 707 that also matches at the next node N2 710, in an effort to find the longest possible match. An unrolling action may include popping context stored that identifies the element node and a count of the number of positively matching consecutive segments matched at the variable count node prior to a segment mismatch. The unrolling action may include decrementing the count and pushing stored context identifying the element node and including the count decremented. The unrolling action may further include updating the current offset and fetching the element node.

As shown for processing cycle 828k, the segment 820h negatively matches at the element node N2 710 and the walker 320 takes the actions 812 shown, similar to the unrolling actions 830 of the processing cycle 828j, and, thus, proceeds to unroll by determining if the segment 820g matches at the element node N2 710 as shown for the processing cycle 828l. Since the segment 820g (i.e., "a") positively matches at the element node N2 710, the walker 320 may update the current offset and fetch the next node N4 714 that may be identified via metadata associated with the element node N2 710. The segment 820h may be positively matched at the node N4 714 as shown for processing cycle 828m and the walker 320 may update the current offset and fetch the next node N5 715 that may be identified via metadata associated with the element node N4 714.

The node N5 715 is a marked node associated with an indicator signifying a final (i.e., complete or entire) match of the regular expression pattern 842 in the input stream. Thus, for the processing cycle 828n, the walker 320 may discontinue the walk and report the final match by storing an entry in the match result buffer 466. The walker may then check the run stack 460 for stored threads and either discard the stored threads or activate them as indicated by the corresponding DUP indicator of the entries in the run stack 460.

Based on the payload 842 segment content, a number of processing cycles for the unrolling may increase. As shown, the action 812 for each of the unrolling cycles 828j and 828k includes popping and pushing of context that may be costly operations as disclosed above. According to embodiments disclosed herein, match performance may be improved by reducing a number or processing cycles needed for the matching and by reducing a number of times memory is accessed by reducing a number of push and pop operations for storing and retrieving context. According to embodiments disclosed herein, match performance may be improved by walking in a speculative manner. For example, the walker 320 may walk the NFA graph 704 in a speculative manner. As disclosed above, processing at least two nodes in parallel may be referred to herein as speculative processing. According to embodiments disclosed herein, match performance based on greedy path processing may be optimized by speculative processing as disclosed below.

Figure 9A:
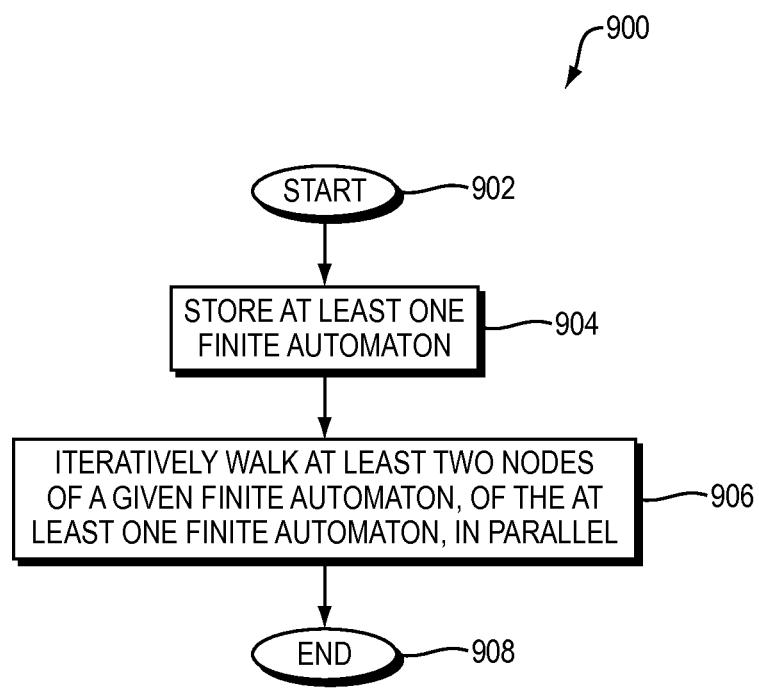
FIG. 9A is a flow diagram of an example embodiment of a method that may be implemented in at least one processor operatively coupled to at least one memory in a security appliance operatively coupled to a network.

FIG. 9A is a flow diagram 900 of an example embodiment of a method that may be implemented in at least one processor operatively coupled to at least one memory in a security appliance operatively coupled to a network. The method may begin (902) and store at least one finite automaton including a plurality of nodes generated from at least one regular expression pattern in at least one memory and operatively couple the at least one memory to at least one processor (904). The at least one processor may be configured to walk the at least one finite automaton, with segments of an input stream received via a hardware network interface operatively coupled to the network, to match the at least one regular expression pattern in the input stream. The walk may include iteratively walking at least two nodes of a given finite automaton, of the at least one finite automaton, in parallel, with a segment, at a current offset within a payload, of a packet in the input stream, based on positively matching the segment at a given node of the at least two nodes walked in parallel, the current offset being updated to a next offset per iteration (906). The method thereafter ends (908) in the example embodiment.

FIG. 9B is a block diagram of an example embodiment of a table 970 of greedy speculative processing rules 978a-d. The table 970 is a truth table with actions 976 that are based on the element node match results 974 and the variable count greedy node match results 972. Four possible cases are shown, corresponding to the greedy speculative processing rules 978a-d. For example, the greedy speculative processing rules 978a, 978b, 978c, and 978d, each have a respective subsequent action 976 based on match results positive/positive, positive/negative, negative/positive, and negative/negative, respectively.

The greedy speculative processing rules 978a and 978b enable the variable count greedy node and the element node to iteratively process a segment, at a current offset within a payload, in parallel, based on a positive match at the variable count greedy node, obviating memory access for node fetching. Further, the greedy speculative processing rule 978a includes storing context as shown by the corresponding action 976. The greedy speculative processing rule 978a includes storing a context identifying the next offset and a next node of the given finite automaton based on positively matching the segment, at the current offset in the payload, at the given node and the element node. The element node is associated with metadata identifying the element and the next node.

The storing of context based on positively matching a segment at both the variable count greedy node and the element node enables the walker 320 to record segment offset and node information to obviate unrolling, such as the unrolling action 830 as disclosed in reference to FIG. 8 above. Storing the context may include pushing an address or other identifier of a next node, identified via metadata associated with the element node, in conjunction with the current offset updated (i.e., the next offset).

As shown by the greedy speculative processing rule 978c, iteratively walking the element and variable count greedy nodes, in parallel, is discontinued, and the current offset is updated. The next node may be fetched and the walker may walk the next node with a next segment at the current offset updated. As such, the greedy speculative processing rule 978c may include discontinuing iteratively walking, updating the current offset to the next offset, and walking the next node with a next segment at the next offset in the payload.

As shown by the greedy speculative processing rule 978d, based on the match results of the variable count greedy node 972 and element node 974 being both negative, the action 976 may include discontinuing the walk of a given path. As such, a next segment, at a next given offset within the payload, may be walked based on sensing unexplored context, such as by checking the run stack 460 for a stored thread and popping the stored thread if stored. Alternatively the walk may be terminated based on not sensing the unexplored context or if all stored threads are marked for discard based on a corresponding Discard Unexplored Processing (DUP) indicator. As such, the greedy speculative processing rule 978d may specify at least one subsequent action that includes discontinuing iteratively walking, and popping a stack entry from the run stack 460. Based on a non-empty status of the run stack 460, a stack entry that was most recently pushed entry onto the stack may be popped, and the walk may be advanced to a next node with a next segment based on the stack entry popped. Otherwise, based on an empty status of the run stack 460, the walk may be terminated.

Figure 10:
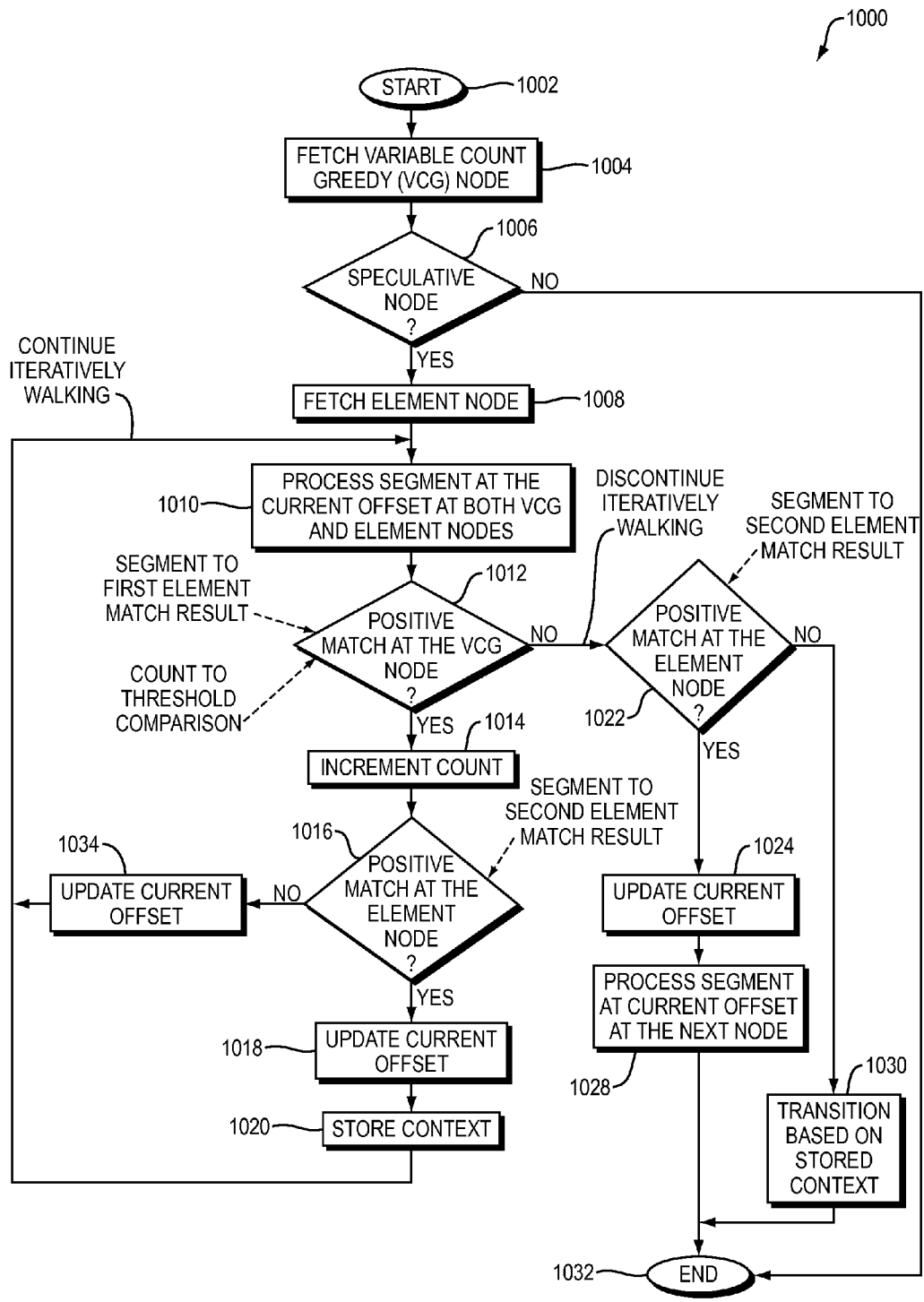
FIG. 10 is a flow diagram of another example embodiment of a method for processing an NFA graph in a speculative manner.

FIG. 10 is a flow diagram 1000 of another example embodiment of a method for processing an NFA graph in a speculative manner. The method may start (1002) and fetch a variable count greedy (VCG) node (1004). The method may check if the VCG node fetched is a speculative node (1006). The walker 320 may determine that the VCG node is speculative based on a speculative processing indicator being included in metadata associated with the VCG node. If the VCG node is not speculative, the method ends (1032) in the example embodiment.

If the VCG node is speculative, the method may fetch an element node (1008). The element node fetched may be a next node identified via the metadata associated with the VCG node. The method may process a segment at a current offset at both the VCG node and the element node (1010). The VCG node may be configured to match a variable number of consecutive instances of a first element in the payload and the element node may be configured to match a single instance of a second element in the payload.

The method may check if the segment at the current offset positively matches at the VCG node (1012). Checking if the segment at the current offset positively matches at the VCG node may include determining that the segment positively matches the first element identified via the metadata associated with the VCG node and determining that the count value of consecutive segments having been positively matched at the VCG node has not exceeded a given threshold. If the segment at the current offset positively matches the VCG node, a count value included in the metadata associated with the VCG node may be incremented (1014).

The method may check if the segment at the current offset positively matches at the element node (1016). Checking if the segment at the current offset positively matches at the element node may include determining that the segment positively matches the second element identified via metadata associated with the element node. It should be understood that such determination of the positive match at the VCG node and element node occur in parallel as the segment at the current offset is processed at both nodes in parallel. The VCG node and the element node may be walked, in parallel, with the segment, at the current offset within the payload, within a same processing cycle of the at least one processor.

If the segment at the current offset positively matches at the element node, the current offset may be updated to a next offset (1018) and context may be stored (1020). Storing the context may include pushing an address or other identifier of a next node, identified via metadata of the element node, in conjunction with the next offset. The method may proceed to process the segment at the next offset at both the VCG and element node in a next iteration by returning to process the segment at the current offset at both the VCG node and the element node (1010).

However, if a positive match of the segment at the current offset at the element node (1016) is not determined, the method may update the current offset to the next offset (1034) and the method may proceed to process the segment at the next offset at both the VCG and element node in a next iteration by returning to process the segment at the current offset at both the VCG and elements nodes (1010). As such, the walk may include iteratively walking the VCG node and the element node, in parallel, with a segment, at a current offset within a payload, based on positively matching the segment at the VCG node. The current offset may be updated to a next offset per iteration as shown by (1018) and (1034).

However, if a positive match of the segment at the current offset at the VCG node (1012) is not determined, the method may discontinue iteratively walking, and the method may determine if the segment at the current offset positively matches at the element node (1022). If no, the method may transition based on stored context (1030) and the method ends (1032) in the example embodiment.

However, if a positive match of the segment at the current offset at the element node (1022) is determined, the method may update the current offset to the next offset (1024). The method may process the segment at the next offset at the next node (1028) and the method thereafter ends (1032) in the example embodiment.

FIG. 11 is a table 1148 of an example embodiment of processing cycles 1158*a-k* for traversing the NFA graph 704 of FIG. 7 in a greedy speculative manner with the payload 842 of FIG. 8. As shown in the table 1148, processing cycles 1158*a-k* may include traversing a current node 1150 with a segment from the payload 842 at a current offset 1152 to determine a match result 1154 and at least one subsequent action 1156 based on the match result 1154. According to embodiments disclosed herein, the walker 320 may process both the variable count greedy node N1N3' 707 and the element node N2 710, in parallel, with a given segment at a given offset in the payload 842, optimizing the match performance using the greedy speculative processing rules disclosed above in reference to FIG. 9B. The variable count greedy node N1N3' 707 and the element node N2 710 may be walked, in parallel, with the segment, at the current offset within the payload, within a same processing cycle of the at least one processor.

According to embodiments disclosed herein, the metadata associated with the variable count greedy node may include a speculative processing indicator. According to embodiments disclosed herein, if the speculative processing indicator is not included in the metadata 709 associated with the variable count greedy node N1N3' 707, the walker 320 may continue as in the example embodiment of FIG. 8. Including the speculative processing indicator may be performed in any suitable manner that enables the walker 320 to walk the variable count greedy node and the element node, in parallel, with the segment, at the current offset in the payload.

According to the example embodiment of FIG. 11, the walker 320 may walk the starting node N0 706 with the segment 822*a* (i.e., "h") at the current offset 820*a* (i.e., "0"). The walker 320 may determine that the match result 1154 is a positive match result for the processing cycle 1158*a* as the segment 822*a* matches character "h" at the node N0 706. In the example embodiment of FIG. 11, a next node indicated by the node N0 706 is the variable count greedy node N1N3' 707. As such, the walker 320 may take the action 1156 for the processing cycle 1158*a* that includes updating the current offset to 820*b* (i.e., "1") in the payload 842 and fetching the next node associated with metadata of the node N0 706 that is the variable count greedy node N1N3' 707.

According to the example embodiment of FIG. 11, the metadata 709 associated with the variable count greedy node N1N3' 707 includes the speculative processing indicator (not shown) as detected for the processing cycle 1158*a*. As such, the action 1156 includes fetching the next node identified via that metadata 709, which is the element node N2 710, and transitioning to both the variable count greedy node N1N3' 707 and the element node N2 710 to walk both nodes with the segment at the current offset 820*b* (i.e., "1") in the payload 842.

As shown for processing cycle 1158*b*, the walker 320 may determine a negative match result for the segment 822*b* (i.e., "x") at the element node N2 710 and a positive match result at the variable count greedy node N1N3' 707. Such match results map to the greedy speculative processing rule entry 978*b*. As such, the action 976 specifies that the current offset be updated and that the element and variable count greedy nodes, such as nodes N2 710 and N1N3' 707, respectively, be processed (i.e., walked) again, based on the positive match result at the variable count greedy node N1N3' 707. As the nodes N2 710 and N1N3' 707 were already fetched for the processing cycle 1158*b*, no node fetch is needed for the processing cycle 1158*c*. The count value (not shown) included in the metadata 709 may be incremented to 1 based on the positive match result 1154 at the variable count greedy node N1N3' 707 and the current offset may be updated to 2.

As shown for the processing cycle 1158*c*, the walker 320 walks the element node N2 710 and the variable count greedy node N1N3' 707 with the segment 822*c* (i.e., "x") at the updated offset which is offset 820*c* (i.e., "2") in the payload 842. The match result 1154 is again negative at the element node N2 710 and positive at the variable count greedy node N1N3' 707 as the segment "x" does not match the element "a" at the element node N2 710 but matches the "^\n" element at the variable count greedy node N1N3' 707, as "x" is not a newline character. The match results 1154 again map to the greedy speculative processing rule entry 978*b*. As such, the action 976 specifies that the current offset be updated and that the element and variable count greedy nodes, such as nodes N2 710 and N1N3' 707, respectively, be processed (i.e., walked) again, based on the positive match result at the variable count greedy node N1N3' 707. The count value may be incremented to 2 based on the positive match result 1154 at the variable count greedy node N1N3' 707 and the current offset may be increment to 3.

As shown for the processing cycle 1158*d* the walker 320 walks the element node N2 710 and the variable count greedy node N1N3' 707 with the segment 822*c* (i.e., "x") at the current offset which is offset 820*d* (i.e., "3") in the payload 842. The match result 1154 is again negative at the element node N2 710 and positive at the variable count greedy node N1N3' 707 and, thus, the action 1156 is similar to processing cycles 1158*b* and 1158*c* disclosed above.

As shown for the processing cycle 1158*e* the walker 320 walks the element node N2 710 and the variable count greedy node N1N3' 707 with the segment 822*e* (i.e., "a") at the current offset which is offset 820*d* (i.e., "4") in the payload 842. The match result 1154 is positive at both the element node N2 710 and the variable count greedy node N1N3' 707. The match results 1154 map to the greedy speculative processing rule entry 978*a*. Thus, in addition to incrementing the count value and updating the current offset, the action 1156 further includes storing unexplored context that includes pushing a stack entry identifying the node N4 714 that is the next node identified via metadata associated with element node N2 710 and the current offset that is now 5. As such, if a subsequent cycle determines a segment mismatch at the variable count greedy node N1N3' 707, the walker 320 may walk the node N4 714 with the segment 822*f* at the current offset 5, obviating unrolling to find the offset at which both the element node N2 710 and the variable count greedy node N1N3' 707 positively matched a same segment.

As shown for processing cycles 1158*f*, 1158*g*, and 1158*h*, the walker 320 continues the iterative walk of the element node N2 710 and the variable count greedy node N1N3' 707 based on the positive match result 1154 at the variable count greedy node N1N3' 707. However, as shown for the processing cycle 1158*g*, similar to the processing cycle 1158*e*, disclosed above, unexplored context may be stored to enable the walker to return to the node N4 714 that is the next node identified via metadata associated with element node N2 710 with a segment corresponding to the offset 822h corresponding to offset 7 which is the updated current offset for use in the consecutive processing cycle 1158h.

As shown for the processing cycle 1158i, the walker 320 may determine a negative match result for the segment 822i (i.e., "\n") at the element node N2 710 and a negative match result at the variable count greedy node N1N3' 707. Such match results map to the greedy speculative processing rule entry 978d. As such, iteratively walking of the element node N2 710 and the variable count greedy node N1N3' 707 is discontinued as the match result 1154 at the variable count greedy node N1N3' 707 is negative. The walker 320 may check the stack for stored entries and if the stack is non-empty the most recently pushed entry may be popped. As such, the entry pushed for processing cycle 1158g may be popped to enable the walker to fetch the node N4 714 and transition to the node N4 714 with the segment 822h at the offset 820h.

As shown for the processing cycle 1158j, the segment 822h (i.e., "b") at the offset 820h identified via the stack entry popped for processing cycle 1158h positively matches at the node N4 714. Thus, the walker 320 updates the current offset to 820i and fetches the node N5 715 that is the next node identified via the metadata associated with the node N4 714.

Since the node N5 715 is a marked node, the walker may store the final match result to the match result buffer 466 and discontinue walking the active thread (e.g., the current path). The walker 320 may check the run stack 460 for an empty status. In the example embodiment the run stack 460 is not empty as unexplored context was pushed to the run stack 460 in the processing cycle 1158e. As such, the walker 320 may pop the unexplored context that indicates advancing the walk to the node N4 714 with the segment 822f (i.e., "b") at the offset 820f (i.e., "5") and determine whether to discard the unexplored context or process the unexplored context based on the DUP indicator associated with the stack entry.

According to embodiments disclosed herein, updating the current offset may include incrementing or decrementing the current offset based on a forward or reverse direction of the walk, respectively. As such, incrementing or decrementing of the current offset is for illustrative purpose in accordance with a direction of the walk of the examples.

As shown in the table 1148 of the example embodiment, the number of processing cycles using greedy speculative processing for matching the payload 842 to the pattern 502 is eleven, which is a reduced number as compared with the fourteen processing cycles needed for the greedy non-speculative processing example embodiment of FIG. 8. It should be appreciated that such performance increases based on greedy speculative processing as shown by the example embodiments disclosed above are for illustrative purposes and that performance gains achieved by using greedy speculative processing may be more than those illustrated. For example, such performance gains may increase depending upon an input payload. Based on content of the input stream, further unrolling, such as the unrolling for processing cycles 828j and 828k of FIG. 8 may be more prevalent for different payloads, resulting in greater performance gains.

Figure 12:
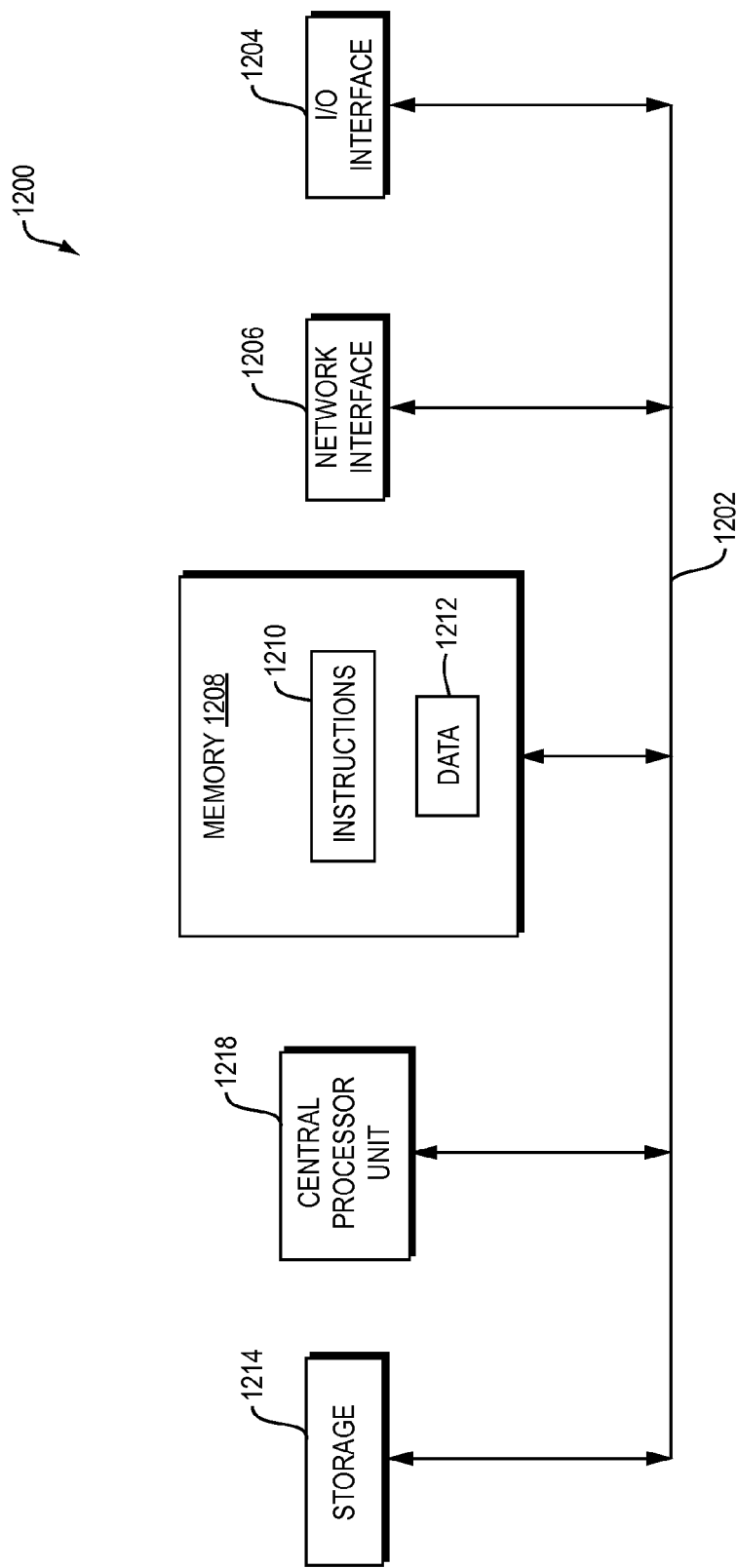
FIG. 12 is a block diagram of an example internal structure of a computer optionally within an embodiment disclosed herein.

FIG. 12 is a block diagram of an example of the internal structure of a computer 1200 in which various embodiments of the present invention may be implemented. The computer 1200 contains a system bus 1202, where a bus is a set of hardware lines used for data transfer among the components of a computer or processing system. The system bus 1202 is essentially a shared conduit that connects different elements of a computer system (e.g., processor, disk storage, memory, input/output ports, network ports, etc.) that enables the transfer of information between the elements. Operative with the system bus 1202 is an I/O device interface 1204 for connecting various input and output devices (e.g., keyboard, mouse, displays, printers, speakers, etc.) to the computer 1200. A network interface 1206 allows the computer 1200 to connect to various other devices attached to a network. Memory 1208 provides volatile storage for computer software instructions 1210 and data 1212 that may be used to implement embodiments of the present invention. Disk storage 1214 provides non-volatile storage for computer software instructions 1210 and data 1212 that may be used to implement embodiments of the present invention. A central processor unit 1218 is also operative with the system bus 1202 and provides for the execution of computer instructions.

Further example embodiments of the present invention may be configured using a computer program product; for example, controls may be programmed in software for implementing example embodiments of the present invention. Further example embodiments of the present invention may include a non-transitory computer-readable medium containing instructions that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware.

It should be understood that the term "herein" is transferrable to an application or patent incorporating the teachings presented herein such that the subject matter, definitions, or data carries forward into the application or patent making the incorporation.

If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A security appliance operatively coupled to a network, the security appliance comprising:
   at least one memory configured to store at least one finite automaton including a plurality of nodes generated from at least one regular expression pattern;
   at least one processor operatively coupled to the at least one memory and configured to walk the at least one finite automaton, with segments of an input stream received via the network, to match the at least one regular expression pattern in the input stream, the walk including iteratively walking at least two nodes of a given finite automaton, of the at least one finite automaton, in parallel, with a segment, at a current offset within a payload, of a packet in the input stream, based on positively matching the segment at a given node of the at least two nodes walked in parallel, the current offset being updated to a next offset per iteration.

2. The security appliance of claim 1, wherein iteratively walking further includes, per iteration:
walking the at least two nodes, in parallel, with the segment, at the current offset within the payload, within a same processing cycle of the at least one processor.

3. The security appliance of claim 1, wherein the at least two nodes include an element node configured to match a single instance of an element in the payload, and wherein iteratively walking further includes, per iteration:
storing a context identifying the next offset and a next node of the given finite automaton based on positively matching the segment, at the current offset in the payload, at the given node and the element node, the element node associated with metadata identifying the element and the next node.

4. The security appliance of claim 3, further comprising at least one stack operatively coupled to the at least one processor and wherein:
storing the context includes storing the context in a stack entry and pushing the stack entry onto the at least one stack.

5. The security appliance of claim 1, wherein the given node is a variable count greedy (VCG) node configured to match a threshold number of consecutive instances of an element in the payload and wherein positively matching the segment at the VCG node is based on positively matching the segment to the element.

6. The security appliance of claim 5, wherein positively matching the segment at the VCG node includes incrementing a count value associated with the VCG node and is further based on the count value incremented being less than or equal to the threshold number and wherein the method further includes negatively matching the segment at the VCG node based on negatively matching the segment to the element or determining that the threshold number has been exceeded.

7. The security appliance of claim 1, wherein the given node of the at least two nodes is associated with metadata and iteratively walking of the at least two nodes, in parallel, is further based on the metadata of the given node including a speculative processing indicator.

8. The security appliance of claim 1, wherein the at least two nodes walked in parallel include an element node and a VCG node, the given node being the VCG node, and wherein the VCG node is configured to match a variable number of consecutive instances of a first element in the payload and the element node is configured to match a single instance of a second element in the payload.

9. The security appliance of claim 8, wherein the VCG node is associated with metadata identifying, either directly or indirectly, the element node, the variable number of consecutive instances, and the first element.

10. The security appliance of claim 9, wherein the metadata associated with the VCG node further includes a count value for tracking a total number of consecutive instances of the first element matching in the payload to enable a comparison of the total number to the variable number.

11. The security appliance of claim 8, wherein the first element is one of a first character or first character class and the second element is one of a second character or second character class.

12. The security appliance of claim 8, wherein the given finite automaton is a non-deterministic finite automaton (NFA) graph and the NFA graph includes a transition from the VCG node to the element node, the VCG node preceding the element node in the NFA graph.

13. The security appliance of claim 8, wherein based on negatively matching the segment, at the current offset in the payload, at the VCG node, and positively matching the segment, at the current offset in the payload, at the element node, the walk further includes:
discontinuing iteratively walking;
updating the current offset to the next offset; and
walking a next node with a next segment at the next offset in the payload.

14. The security appliance of claim 13, wherein updating the current offset includes incrementing or decrementing the current offset based on a forward or reverse direction of the walk, respectively.

15. The security appliance of claim 8, further comprising at least one stack operatively coupled to the at least one processor and wherein, based on negatively matching the segment at the VCG node and the element node, the walk further includes:
discontinuing iteratively walking;
popping a stack entry from the stack at least one stack, based on a non-empty status of the at least one stack, the stack entry being a most recently pushed entry onto the stack, and advancing the walk to a next node with a next segment based on the stack entry popped; and
terminating the walk based on an empty status of the at least one stack.

16. The security appliance of claim 1, wherein the current offset is updated to the next offset by incrementing or decrementing the current offset.

17. The security appliance of claim 16, wherein the current offset is incremented based on a forward walk direction of walking and decremented based on a reverse walk direction of walking.

18. The security appliance of claim 1, wherein the at least one finite automaton includes a deterministic finite automaton (DFA) and at least one non-deterministic finite automaton (NFA), the given finite automaton being a given NFA of the at least one NFA.

19. A method comprising:
storing at least one finite automaton including a plurality of nodes generated from at least one regular expression pattern in at least one memory; and
operatively coupling the at least one memory to at least one processor, the at least one processor configured to walk the at least one finite automaton, with segments of an input stream received via a hardware network interface operatively coupled to a network, to match for the at least one regular expression pattern in the input stream, the walk including iteratively walking at least two nodes of a given finite automaton, of the at least one finite automaton, in parallel, with a segment, at a current offset within a payload, of a packet in the input stream, based on positively matching the segment at a given node of the at least two nodes walked in parallel, the current offset being updated to a next offset per iteration.

20. The method of claim 19, wherein iteratively walking further includes, per iteration:

walking the at least two nodes, in parallel, with the segment, at the current offset within the payload, within a same processing cycle of the at least one processor.

21. The method of claim 19, wherein the at least two nodes include an element node configured to match a single instance of an element in the payload, and wherein iteratively walking further includes, per iteration:
storing a context identifying the next offset and a next node of the given finite automaton based on positively matching the segment, at the current offset in the payload, at the given node and the element node, the element node associated with metadata identifying the element and the next node.

22. The method of claim 21, wherein the security appliance further comprises at least one stack and the method further includes operatively coupling the at least one processor to the at least one stack and wherein storing the context includes storing the context in a stack entry and pushing the stack entry onto the at least one stack.

23. The method of claim 19, wherein the given node is a variable count greedy (VCG) node configured to match a threshold number of consecutive instances of an element in the payload and wherein positively matching the segment at the VCG node is based on positively matching the segment to the element.

24. The method of claim 23, wherein positively matching the segment at the VCG node includes incrementing a count value associated with the VCG node and is further based on the count value incremented being less than or equal to the threshold number and wherein the method further includes negatively matching the segment at the VCG node based on negatively matching the segment to the element or determining that the threshold number has been exceeded.

25. The method of claim 19, further including associating the given node of the at least two nodes with metadata and wherein iteratively walking of the at least two nodes, in parallel, is further based on the metadata of the given node including a speculative processing indicator.

26. The method of claim 19, wherein the at least two nodes walked in parallel include an element node and a VCG node, the given node being the VCG node, and wherein the VCG node is configured to match a variable number of consecutive instances of a first element in the payload and the element node is configured to match a single instance of a second element in the payload.

27. The method of claim 26, further including associating the VCG node with metadata identifying, either directly or indirectly, the element node, the variable number of consecutive instances, and the first element.

28. The method of claim 27, wherein the metadata associated with the VCG node further includes a count value for tracking a total number of consecutive instances of the first element matching in the payload to enable a comparison of the total number to the variable number.

29. The method of claim 26, wherein the first element is one of a first character or first character class and the second element is one of a second character or second character class.

30. The method of claim 26, wherein the given finite automaton is a non-deterministic finite automaton (NFA) graph and the NFA graph includes a transition from the VCG node to the element node, the VCG node preceding the element node in the NFA graph.

31. The method of claim 26, wherein based on negatively matching the segment, at the current offset in the payload, at the VCG node, and positively matching the segment, at the current offset in the payload, at the element node, the walk further includes:
discontinuing iteratively walking;
updating the current offset to the next offset; and
walking a next node with a next segment at the next offset in the payload.

32. The method of claim 31, wherein updating the current offset includes incrementing or decrementing the current offset based on a forward or reverse direction of the walk, respectively.

33. The method of claim 26, wherein the security appliance further comprises at least one stack and the method further includes operatively coupling to the at least one processor to the at least one stack and wherein, based on negatively matching the segment at the VCG node and the element node, the walk further includes:
discontinuing iteratively walking;
popping a stack entry from the stack at least one stack, based on a non-empty status of the at least one stack, the stack entry being a most recently pushed entry onto the stack, and advancing the walk to a next node with a next segment based on the stack entry popped; and
terminating the walk based on an empty status of the at least one stack.

34. The method of claim 19, wherein the current offset is updated to the next offset by incrementing or decrementing the current offset.

35. The method of claim 34, wherein the current offset is incremented based on a forward walk direction of walking and decremented based on a reverse walk direction of the walking.

36. The method of claim 19, wherein the at least one finite automaton includes a deterministic finite automaton (DFA) and at least one non-deterministic finite automaton (NFA), the given finite automaton being a given NFA of the at least one NFA.

37. A non-transitory computer-readable medium having encoded thereon a sequence of instructions which, when executed by at least one processor, causes the at least one processor to:
walk at least one finite automaton, including a plurality of nodes generated from at least one regular expression pattern, with segments of an input stream, to match the at least one regular expression pattern in the input stream, the walk including iteratively walking at least two nodes of a given finite automaton, of the at least one finite automaton, in parallel, with a segment, at a current offset within a payload, of a packet in the input stream, based on positively matching the segment at a given node of the at least two nodes walked in parallel, the current offset being updated to a next offset per iteration.

* * * * *